US011838498B2

(12) United States Patent
Zhao et al.

(10) Patent No.: US 11,838,498 B2
(45) Date of Patent: Dec. 5, 2023

(54) HARMONIZED DESIGN FOR INTRA BI-PREDICTION AND MULTIPLE REFERENCE LINE SELECTION

(71) Applicant: Tencent America LLC, Palo Alto, CA (US)

(72) Inventors: Liang Zhao, Sunnyvale, CA (US); Xin Zhao, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/570,603

(22) Filed: Jan. 7, 2022

(65) Prior Publication Data

US 2022/0417497 A1 Dec. 29, 2022

Related U.S. Application Data

(60) Provisional application No. 63/215,888, filed on Jun. 28, 2021.

(51) Int. Cl.
*H04N 19/105* (2014.01)
*H04N 19/176* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11)

(58) Field of Classification Search
CPC .. H04N 19/105; H04N 19/132; H04N 19/159; H04N 19/176
See application file for complete search history.

(56) References Cited

U.S. PATENT DOCUMENTS

2008/0310504 A1* 12/2008 Ye .................. H04N 19/157
375/E7.199
2014/0294078 A1 10/2014 Seregin et al.
(Continued)

FOREIGN PATENT DOCUMENTS

WO WO 2013/119937 A1 8/2013
WO WO-2018219925 A1 * 12/2018 ............. H04N 19/11
WO WO 2020/005506 A1 1/2020

OTHER PUBLICATIONS

International Search Report and Written Opinion regarding PCT/US22/13314 dated May 6, 2022, 10 pages.
(Continued)

*Primary Examiner* — Hesham K Abouzahra
(74) *Attorney, Agent, or Firm* — Crowell & Moring LLP

(57) ABSTRACT

Methods, apparatus, and computer readable storage medium for intra bi-prediction and multiple reference line intra prediction in video decoding. The method includes receiving, by a device, a coded video bitstream for a block. The method also includes determining, by the device, whether a single directional intra prediction or an intra bi-prediction applies to the block, based on mode information of the block, the mode information of the block comprising at least one of: a reference line index of the block, an intra prediction mode of the block, and a size of the block; in response to determining that the single directional intra prediction applies to the block, performing, by the device, the single directional intra prediction to the block; and in response to determining that the intra bi-prediction applies to the block, performing, by the device, the intra bi-prediction to the block.

19 Claims, 19 Drawing Sheets

(51) Int. Cl.
   *H04N 19/159* (2014.01)
   *H04N 19/132* (2014.01)

(56) References Cited

U.S. PATENT DOCUMENTS

| | | | |
|---|---|---|---|
| 2015/0326880 A1 | 11/2015 | He et al. | |
| 2020/0077093 A1* | 3/2020 | Jang | H04N 19/105 |
| 2021/0281830 A1* | 9/2021 | Lee | H04N 19/182 |

OTHER PUBLICATIONS

Zhao et al., "Improved Intra Coding Beyond AV1 Using Adaptive Prediction Angles and Reference Lines," Tencent, Palo Alto, CA, 2020, 5 pages.
Jin et al., "Improved Intra Mode Coding Beyond AV1," Tencent America, Palo Alto, CA, 2021, 5 pages.
Chen et al., "An Overview of Core Coding Tools in the AV1 Video Codec," Google, USA, 2018, 5 pages.
De Rivaz et al., "AV1 Bitstream & Decoding Process Specification," Jan. 8, 2019.
Chang et al., "Intra prediction using multiple reference lines for the versatile video coding standard," 8 pages.
Guo et al., "Intra Bi-Prediction (IBP)," Alliance for Open Media, Codec Working Group, Document: CWG-B056, Apple Inc., Jun. 24, 2021, 7 pages.
Zhao et al., "Wide Angular Intra Prediction for Versatile Video Coding," Tencent, Palo Alto, CA, 10 pages.
Extended European Search Report regarding EP 22 80 0555 dated Jul. 6, 2023.
Chen J. et al., "Algorithm description for Versatile Video Coding and Test Model 11 (VTM 11)," 20. JVET Meeting, Oct. 7, 2020-Oct. 16, 2020; Teleconference; Jul. 20, 2023 Exploration Team and ITU-T SG.16) (The Joint Video of ISO/IEC JTC1/SC29/WG11), No. JVET-T2002, Jan. 5, 2021, Retrieved from the Internet: https://jvetexperts.org/doc_end_user/documents/20_Teleconference/wg11/JVET-T2002-v5.zi9 JVET-T2002-v2.docx.
Van Der Auwera (Qualcomm) G et al., "Extension of Simplified PDPC to Diagonal Intra Modes," 10. JVET Meeting; Apr. 10, 2018-Apr. 20, 2018; San Diego; (The Joint Video Exploration Team of ISO/IEC JTC1/SC29/WG11 and ITU-T SG.16) No. JVET-J0069, Apr. 14, 2018, Retrieved from the Internet: http://phenix.int-evry.fr/jvet/doc_end_user/documents/10_San%20Diego/wg11/JVET-J0069-v3.zip JVET-J0069_rl.doc.
Li (Peking Univ) J. et al., "EE6: Multiple line-based intra prediction," 4. JVET Meeting; Oct. 15, 2016-Oct. 21, 2016; Chengdu; (The Joint Video Exploration Team of ISO/IEC JTC1/SC29/WG11 and ITU-T SG.16) No. JVET-D0149, Oct. 8, 2016, XP030150409, Retrieved from the Internet: http://phenix.int-evry.fr/jvet/doc_end_user/documents/4_Chengdu/wg11/JVET-D0149-vl.zipJVET-D0149.doc.
Wien Mathias, "Chapter 6: Intra Prediction," In: "High Efficiency Video Coding—Coding Tools and Specification," Oct. 8, 2014, Springer-Verlag, Berlin Heidelberg, XP093033033, pp. 161-177.
Chen J. et al., "Algorithm description of Joint Exploration Test Model 7 (JEM7)," 7. JVET Meeting; Jul. 13, 2017-Jul. 21, 2017, Torino; (The Joint Video Exploration Team of ISO/IEC JTC1/SC29/WG11 and ITU-T SG.16), Jul. 13, 2017-Jul. 21, 2017; Torino No. G1001_vl; JVET-G1001, Aug. 19, 2017, pp. 1-48, XP030150980, Retrieved from the Internet: http://phenix.int-evry.fr/jvet/doc_end_user/documents/7_Torino/wg11/JVET-G1001v1.zip JVET-G1001-vl.docx.

* cited by examiner

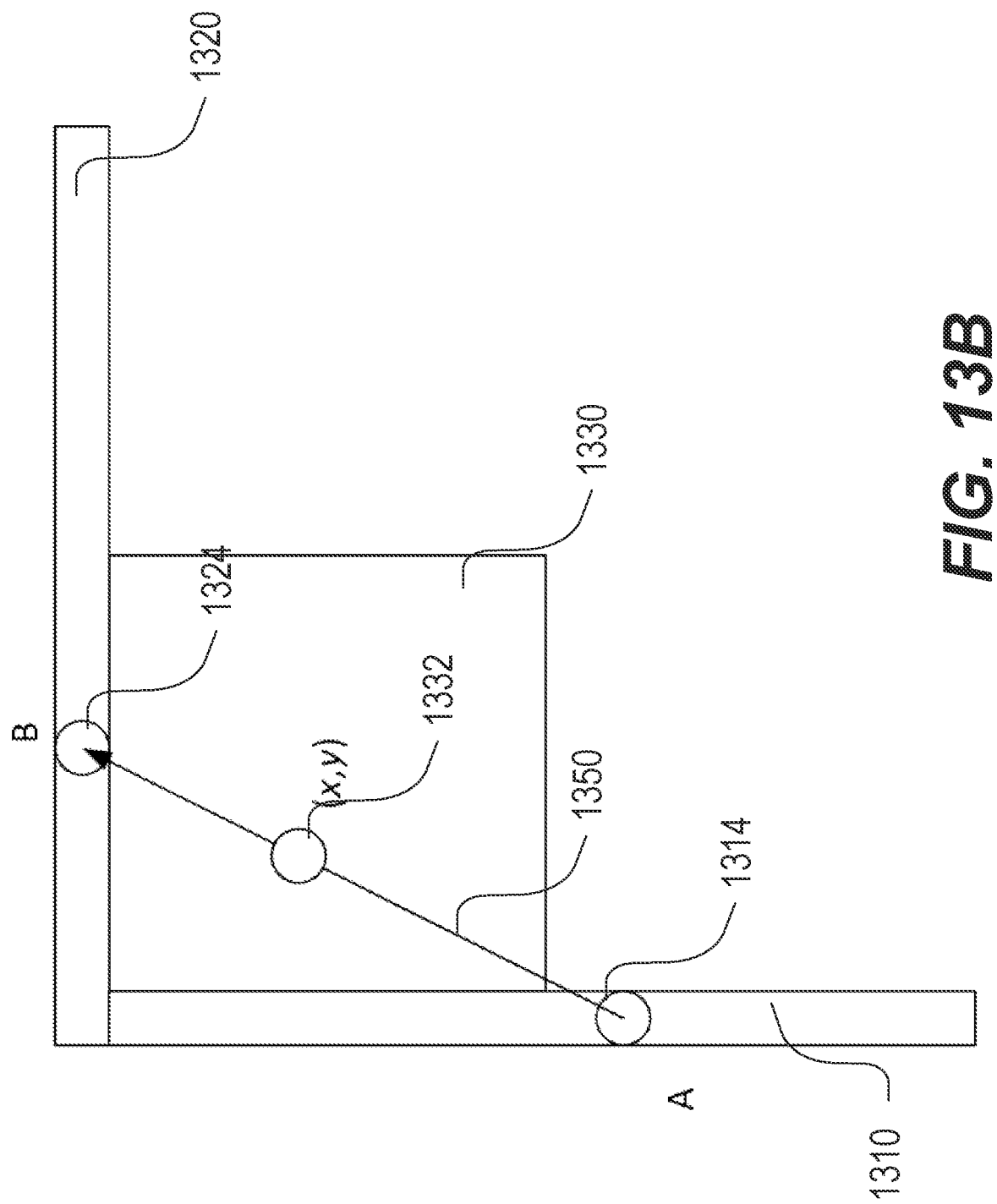

HARMONIZED DESIGN FOR INTRA BI-PREDICTION AND MULTIPLE REFERENCE LINE SELECTION

RELATED APPLICATION

This application is a based on and claims the benefit of priority to U.S. Provisional Application No. 63/215,888 filed on Jun. 28, 2021, which is herein incorporated by reference in its entirety.

FIELD OF THE TECHNOLOGY

The present disclosure relates to video coding and/or decoding technologies, and in particular, to improved design and signaling of intra bi-prediction and multiple reference line selection scheme.

BACKGROUND OF THE DISCLOSURE

This background description provided herein is for the purpose of generally presenting the context of the disclosure. Work of the presently named inventors, to the extent the work is described in this background section, as well as aspects of the description that may not otherwise qualify as prior art at the time of filing of this application, are neither expressly nor impliedly admitted as prior art against the present disclosure.

Video coding and decoding can be performed using inter-picture prediction with motion compensation. Uncompressed digital video can include a series of pictures, with each picture having a spatial dimension of, for example, 1920×1080 luminance samples and associated full or sub-sampled chrominance samples. The series of pictures can have a fixed or variable picture rate (alternatively referred to as frame rate) of, for example, 60 pictures per second or 60 frames per second. Uncompressed video has specific bitrate requirements for streaming or data processing. For example, video with a pixel resolution of 1920×1080, a frame rate of 60 frames/second, and a chroma subsampling of 4:2:0 at 8 bit per pixel per color channel requires close to 1.5 Gbit/s bandwidth. An hour of such video requires more than 600 GBytes of storage space.

One purpose of video coding and decoding can be the reduction of redundancy in the uncompressed input video signal, through compression. Compression can help reduce the aforementioned bandwidth and/or storage space requirements, in some cases, by two orders of magnitude or more. Both lossless compression and lossy compression, as well as a combination thereof can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application albeit some information loss. In the case of video, lossy compression is widely employed in many applications. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

A video encoder and decoder can utilize techniques from several broad categories and steps, including, for example, motion compensation, Fourier transform, quantization, and entropy coding.

Video codec technologies can include techniques known as intra coding. In intra coding, sample values are represented without reference to samples or other data from previously reconstructed reference pictures. In some video codecs, a picture is spatially subdivided into blocks of samples. When all blocks of samples are coded in intra mode, that picture can be referred to as an intra picture. Intra pictures and their derivatives such as independent decoder refresh pictures, can be used to reset the decoder state and can, therefore, be used as the first picture in a coded video bitstream and a video session, or as a still image. The samples of a block after intra prediction can then be subject to a transform into frequency domain, and the transform coefficients so generated can be quantized before entropy coding. Intra prediction represents a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as that known from, for example, MPEG-2 generation coding technologies, does not use intra prediction. However, some newer video compression technologies include techniques that attempt coding/decoding of blocks based on, for example, surrounding sample data and/or metadata that are obtained during the encoding and/or decoding of spatially neighboring, and that precede in decoding order the blocks of data being intra coded or decoded. Such techniques are henceforth called "intra prediction" techniques. Note that in at least some cases, intra prediction uses reference data only from the current picture under reconstruction and not from other reference pictures.

There can be many different forms of intra prediction. When more than one of such techniques are available in a given video coding technology, the technique in use can be referred to as an intra prediction mode. One or more intra prediction modes may be provided in a particular codec. In certain cases, modes can have submodes and/or may be associated with various parameters, and mode/submode information and intra coding parameters for blocks of video can be coded individually or collectively included in mode codewords. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). Generally, for intra prediction, a predictor block can be formed using neighboring sample values that have become available. For example, available values of particular set of neighboring samples along certain direction and/or lines may be copied into the predictor block. A reference to the direction in use can be coded in the bitstream or may itself be predicted.

Referring to FIG. 1A, depicted in the lower right is a subset of nine predictor directions specified in H.265's 33 possible intra predictor directions (corresponding to the 33 angular modes of the 35 intra modes specified in H.265). The point where the arrows converge (101) represents the sample being predicted. The arrows represent the direction from which neighboring samples are used to predict the sample at 101. For example, arrow (102) indicates that sample (101) is predicted from a neighboring sample or samples to the upper right, at a 45 degree angle from the horizontal direction. Similarly, arrow (103) indicates that sample (101) is predicted from a neighboring sample or samples to the lower left of sample (101), in a 22.5 degree angle from the horizontal direction.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are example reference samples that follow a similar numbering scheme. A reference sample is labelled with an R, its Y position (e.g., row index) and X position (column index) relative to block (104). In both H.264 and H.265, prediction samples adjacently neighboring the block under reconstruction are used.

Intra picture prediction of block 104 may begin by copying reference sample values from the neighboring samples according to a signaled prediction direction. For example, assuming that the coded video bitstream includes signaling that, for this block 104, indicates a prediction direction of arrow (102)—that is, samples are predicted from a prediction sample or samples to the upper right, at a 45-degree angle from the horizontal direction. In such a case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has continued to develop. In H.264 (year 2003), for example, nine different direction are available for intra prediction. That increased to 33 in H.265 (year 2013), and JEM/VVC/BMS, at the time of this disclosure, can support up to 65 directions. Experimental studies have been conducted to help identify the most suitable intra prediction directions, and certain techniques in the entropy coding may be used to encode those most suitable directions in a small number of bits, accepting a certain bit penalty for directions. Further, the directions themselves can sometimes be predicted from neighboring directions used in the intra prediction of the neighboring blocks that have been decoded.

FIG. 1B shows a schematic (180) that depicts 65 intra prediction directions according to JEM to illustrate the increasing number of prediction directions in various encoding technologies developed over time.

The manner for mapping of bits representing intra prediction directions to the prediction directions in the coded video bitstream may vary from video coding technology to video coding technology; and can range, for example, from simple direct mappings of prediction direction to intra prediction mode, to codewords, to complex adaptive schemes involving most probable modes, and similar techniques. In all cases, however, there can be certain directions for intro prediction that are statistically less likely to occur in video content than certain other directions. As the goal of video compression is the reduction of redundancy, those less likely directions will, in a well-designed video coding technology, may be represented by a larger number of bits than more likely directions.

Inter picture prediction, or inter prediction may be based on motion compensation. In motion compensation, sample data from a previously reconstructed picture or part thereof (reference picture), after being spatially shifted in a direction indicated by a motion vector (MV henceforth), may be used for a prediction of a newly reconstructed picture or picture part (e.g., a block). In some cases, the reference picture can be the same as the picture currently under reconstruction. MVs may have two dimensions X and Y, or three dimensions, with the third dimension being an indication of the reference picture in use (akin to a time dimension).

In some video compression techniques, a current MV applicable to a certain area of sample data can be predicted from other MVs, for example from those other MVs that are related to other areas of the sample data that are spatially adjacent to the area under reconstruction and precede the current MV in decoding order. Doing so can substantially reduce the overall amount of data required for coding the MVs by relying on removing redundancy in correlated MVs, thereby increasing compression efficiency. MV prediction can work effectively, for example, because when coding an input video signal derived from a camera (known as natural video) there is a statistical likelihood that areas larger than the area to which a single MV is applicable move in a similar direction in the video sequence and, therefore, can in some cases be predicted using a similar motion vector derived from MVs of neighboring area. That results in the actual MV for a given area to be similar or identical to the MV predicted from the surrounding MVs. Such an MV in turn may be represented, after entropy coding, in a smaller number of bits than what would be used if the MV is coded directly rather than predicted from the neighboring MV(s). In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 specifies, described below is a technique henceforth referred to as "spatial merge".

Specifically, referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block uses.

SUMMARY

The present disclosure describes various embodiments of methods, apparatus, and computer-readable storage medium for video encoding and/or decoding.

According to one aspect, an embodiment of the present disclosure provides a method for intra bi-prediction and multiple reference line intra prediction in video decoding. The method includes receiving, by a device, a coded video bitstream for a block. The device includes a memory storing instructions and a processor in communication with the memory. The method also includes determining, by the device, whether a single directional intra prediction or an intra bi-prediction applies to the block based on mode information of the block, the mode information of the block comprising at least one of a reference line index of the block, an intra prediction mode of the block, and a size of the block; in response to determining that the single directional intra prediction applies to the block, performing, by the device, the single directional intra prediction to the block; and in response to determining that the intra bi-prediction applies to the block, performing, by the device, the intra bi-prediction to the block.

According to another aspect, an embodiment of the present disclosure provides an apparatus for video encoding and/or decoding. The apparatus includes a memory storing instructions; and a processor in communication with the memory. When the processor executes the instructions, the processor is configured to cause the apparatus to perform the above methods for video decoding and/or encoding.

In another aspect, an embodiment of the present disclosure provides non-transitory computer-readable mediums storing instructions which when executed by a computer for video decoding and/or encoding cause the computer to perform the above methods for video decoding and/or encoding.

The above and other aspects and their implementations are described in greater detail in the drawings, the descriptions, and the claims.

BRIEF DESCRIPTION OF THE DRAWINGS

Further features, the nature, and various advantages of the disclosed subject matter will be more apparent from the following detailed description and the accompanying drawings.

FIG. 13B shows another intra bi-prediction according to example embodiments of the disclosure.

DETAILED DESCRIPTION OF THE DISCLOSURE

The invention will now be described in detail hereinafter with reference to the accompanied drawings, which form a part of the present invention, and which show, by way of illustration, specific examples of embodiments. Please note that the invention may, however, be embodied in a variety of different forms and, therefore, the covered or claimed subject matter is intended to be construed as not being limited to any of the embodiments to be set forth below. Please also note that the invention may be embodied as methods, devices, components, or systems. Accordingly, embodiments of the invention may, for example, take the form of hardware, software, firmware or any combination thereof.

Throughout the specification and claims, terms may have nuanced meanings suggested or implied in context beyond an explicitly stated meaning. The phrase "in one embodiment" or "in some embodiments" as used herein does not necessarily refer to the same embodiment and the phrase "in another embodiment" or "in other embodiments" as used herein does not necessarily refer to a different embodiment. Likewise, the phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Figure 3:
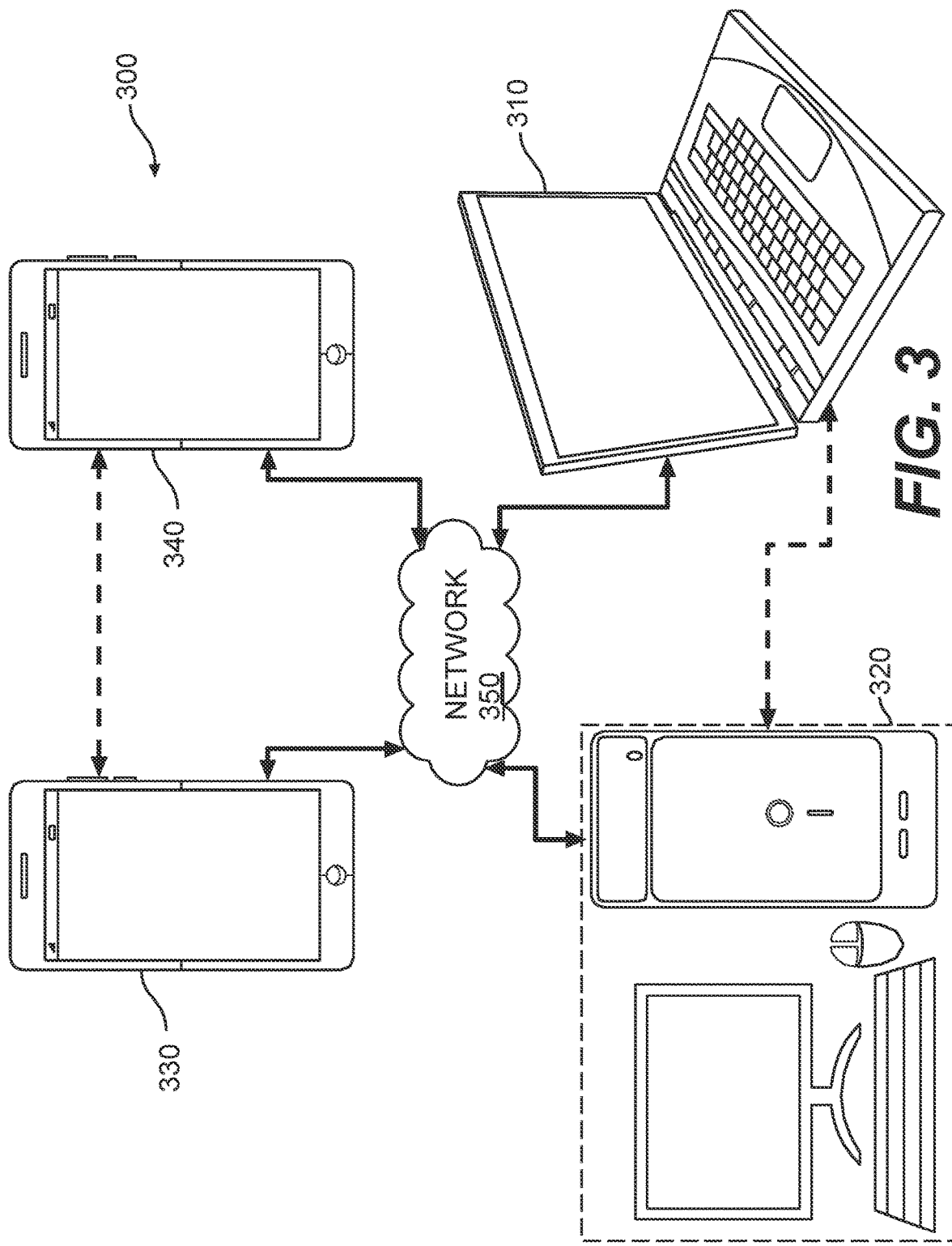
FIG. 3 shows a schematic illustration of a simplified block diagram of a communication system (300) in accordance with an example embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the example of FIG. 3, the first pair of terminal devices (310) and (320) may perform unidirectional transmission of data. For example, the terminal device (310) may code video data (e.g., of a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display the video pictures according to the recovered video data. Unidirectional data transmission may be implemented in media serving applications and the like.

In another example, the communication system (300) includes a second pair of terminal devices (330) and (340) that perform bidirectional transmission of coded video data that may be implemented, for example, during a videoconferencing application. For bidirectional transmission of data, in an example, each terminal device of the terminal devices (330) and (340) may code video data (e.g., of a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display the video pictures at an accessible display device according to the recovered video data.

In the example of FIG. 3, the terminal devices (310), (320), (330) and (340) may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (350) represents any number or types of networks that convey coded video data among the terminal devices (310), (320), (330) and (340), including for example wireline (wired) and/or wireless communication networks. The communication network (350) may exchange data in circuit-switched, packet-switched, and/or other types of channels. Representative networks include telecommunications networks, local area networks, wide area networks and/or the Internet. For the purposes of the present discussion, the architecture and topology of the network (350) may be immaterial to the operation of the present disclosure unless explicitly explained herein.

Figure 4:
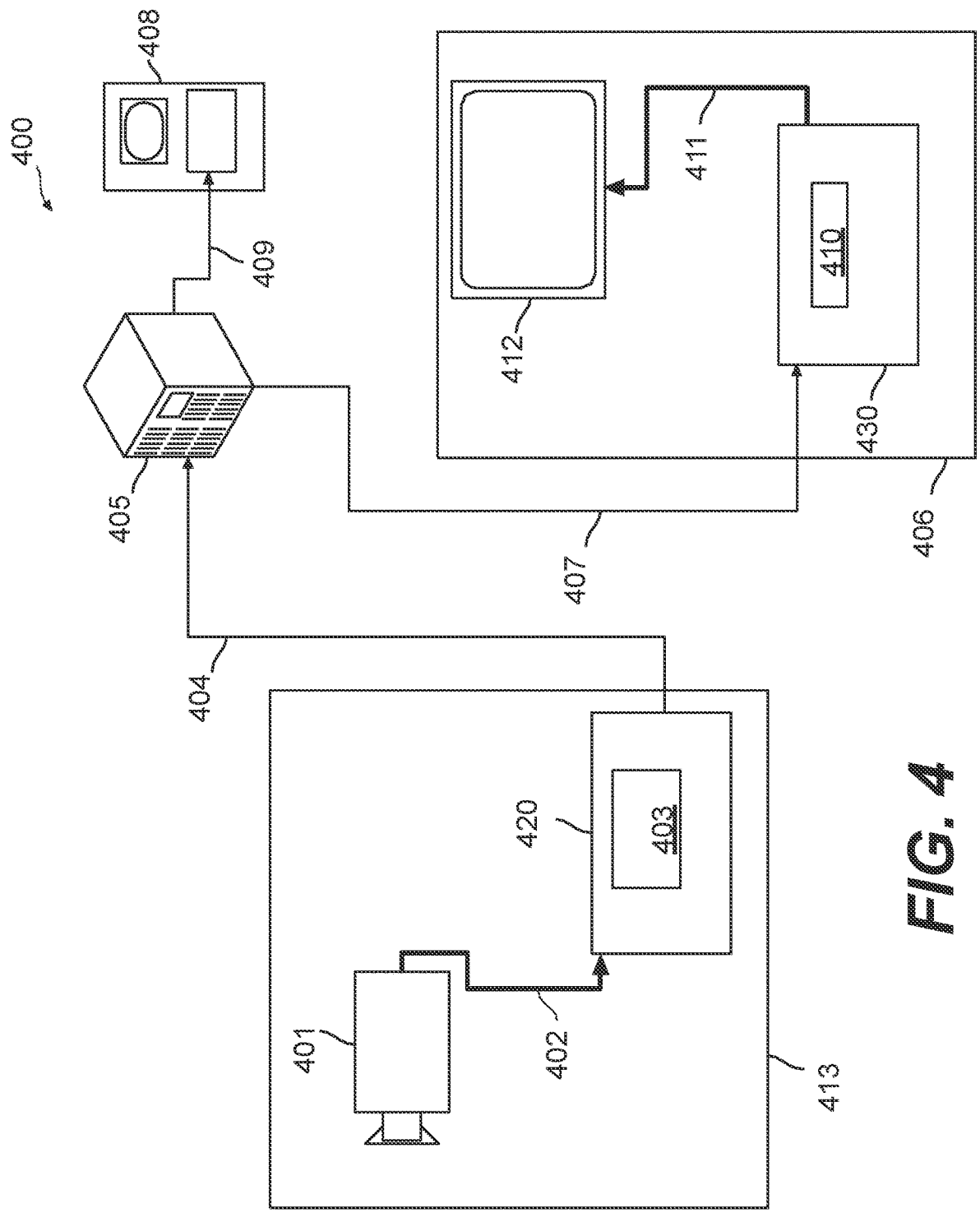
FIG. 4 shows a schematic illustration of a simplified block diagram of a communication system (400) in accordance with an example embodiment.

FIG. 4 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

A video streaming system may include a video capture subsystem (413) that can include a video source (401), e.g., a digital camera, for creating a stream of video pictures or images (402) that are uncompressed. In an example, the stream of video pictures (402) includes samples that are recorded by a digital camera of the video source 401. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize a lower data volume when compared to the stream of uncompressed video pictures (402), can be stored on a streaming server (405) for future use or directly to downstream video devices (not shown). One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that are uncompressed and that can be rendered on a display (412) (e.g., a display screen) or other rendering devices (not depicted). The video decoder 410 may be configured to perform some or all of the various functions described in this disclosure. In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC, and other video coding standards.

It is noted that the electronic devices (420) and (430) can include other components (not shown). For example, the electronic device (420) can include a video decoder (not shown) and the electronic device (430) can include a video encoder (not shown) as well.

Figure 5:
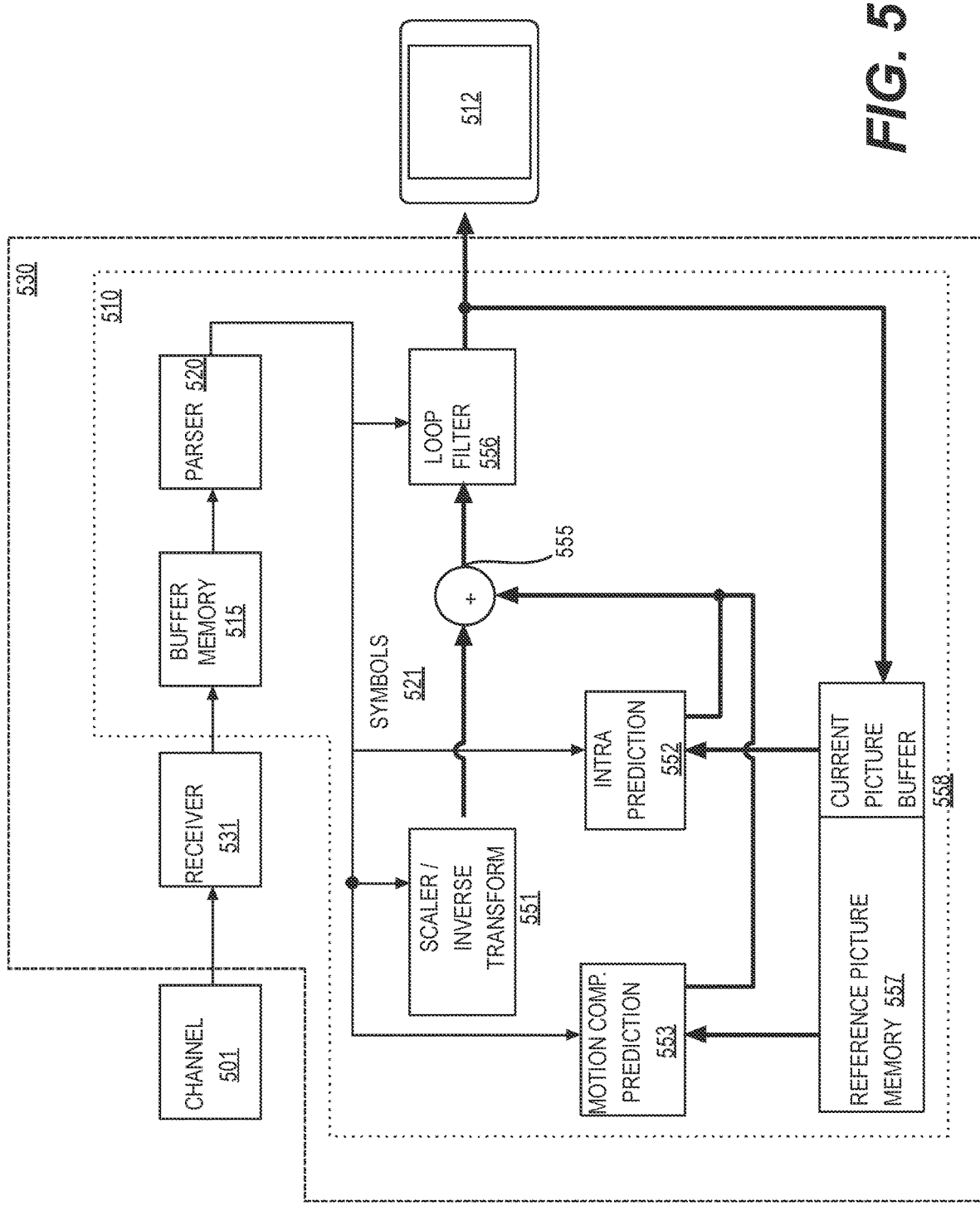
FIG. 5 shows a schematic illustration of a simplified block diagram of a video decoder in accordance with an example embodiment.

FIG. 5 shows a block diagram of a video decoder (510) according to any embodiment of the present disclosure below. The video decoder (510) can be included in an electronic device (530). The electronic device (530) can include a receiver (531) (e.g., receiving circuitry). The video decoder (510) can be used in place of the video decoder (410) in the example of FIG. 4.

The receiver (531) may receive one or more coded video sequences to be decoded by the video decoder (510). In the same or another embodiment, one coded video sequence may be decoded at a time, where the decoding of each coded video sequence is independent from other coded video sequences. Each video sequence may be associated with multiple video frames or images. The coded video sequence may be received from a channel (501), which may be a hardware/software link to a storage device which stores the encoded video data or a streaming source which transmits the encoded video data. The receiver (531) may receive the encoded video data with other data such as coded audio data and/or ancillary data streams, that may be forwarded to their respective processing circuitry (not depicted). The receiver (531) may separate the coded video sequence from the other data. To combat network jitter, a buffer memory (515) may be disposed in between the receiver (531) and an entropy decoder/parser (520) ("parser (520)" henceforth). In certain applications, the buffer memory (515) may be implemented as part of the video decoder (510). In other applications, it can be outside of and separate from the video decoder (510) (not depicted). In still other applications, there can be a buffer memory (not depicted) outside of the video decoder (510) for the purpose of, for example, combating network jitter, and there may be another additional buffer memory (515) inside the video decoder (510), for example to handle playback timing. When the receiver (531) is receiving data from a store/forward device of sufficient bandwidth and controllability, or from an isosynchronous network, the buffer memory (515) may not be needed, or can be small. For use on best-effort packet networks such as the Internet, the buffer memory (515) of sufficient size may be required, and its size can be comparatively large. Such buffer memory may be implemented with an adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as display (512) (e.g., a display screen) that may or may not an integral part of the electronic device (530) but can be coupled to the electronic device (530), as is shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received by the parser (520). The entropy coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the subgroups. The subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients (e.g., Fourier transform coefficients), quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different processing or functional units depending on the type of the coded video picture or parts thereof (such as: inter and intra picture, inter and intra block), and other factors. The units that are involved and how they are involved may be controlled by the subgroup control information that was parsed from the coded video sequence by the parser (520). The flow of such subgroup control information between the parser (520) and the multiple processing or functional units below is not depicted for simplicity.

Beyond the functional blocks already mentioned, the video decoder (510) can be conceptually subdivided into a number of functional units as described below. In a practical implementation operating under commercial constraints, many of these functional units interact closely with each other and can, at least partly, be integrated with one another. However, for the purpose of describing the various functions of the disclosed subject matter with clarity, the conceptual subdivision into the functional units is adopted in the disclosure below.

A first unit may include the scaler/inverse transform unit (551). The scaler/inverse transform unit (551) may receive a quantized transform coefficient as well as control information, including information indicating which type of inverse transform to use, block size, quantization factor/parameters, quantization scaling matrices, and the lie as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block, i.e., a block that does not use predictive information from previously reconstructed pictures, but can use predictive information from previously reconstructed parts of the current picture. Such predictive information can be provided by an intra picture prediction unit (552). In some cases, the intra picture prediction unit (552) may generate a block of the same size and shape of the block under reconstruction using surrounding block information that is already reconstructed and stored in the current picture buffer (558). The current picture buffer (558) buffers, for example, partly reconstructed current picture and/or fully reconstructed current picture. The aggregator (555), in some implementations, may add, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for inter-picture prediction. After motion compensating the fetched samples in accordance with the symbols (521) pertaining to the block, these samples can be added by the aggregator (555) to the output of the scaler/inverse transform unit (551) (output of unit 551 may be referred to as the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y components (shift), and reference picture components (time). Motion compensation may also include interpolation of sample values as fetched from the reference picture memory (557) when sub-sample exact motion vectors are in use, and may also be associated with motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values. Several type of loop filters may be included as part of the loop filter unit 556 in various orders, as will be described in further detail below.

The output of the loop filter unit (556) can be a sample stream that can be output to the rendering device (512) as well as stored in the reference picture memory (557) for use in future inter-picture prediction.

Certain coded pictures, once fully reconstructed, can be used as reference pictures for future inter-picture prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology adopted in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools from all the tools available in the video compression technology or standard as the only tools available for use under that profile. To be standard-compliant, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In some example embodiments, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
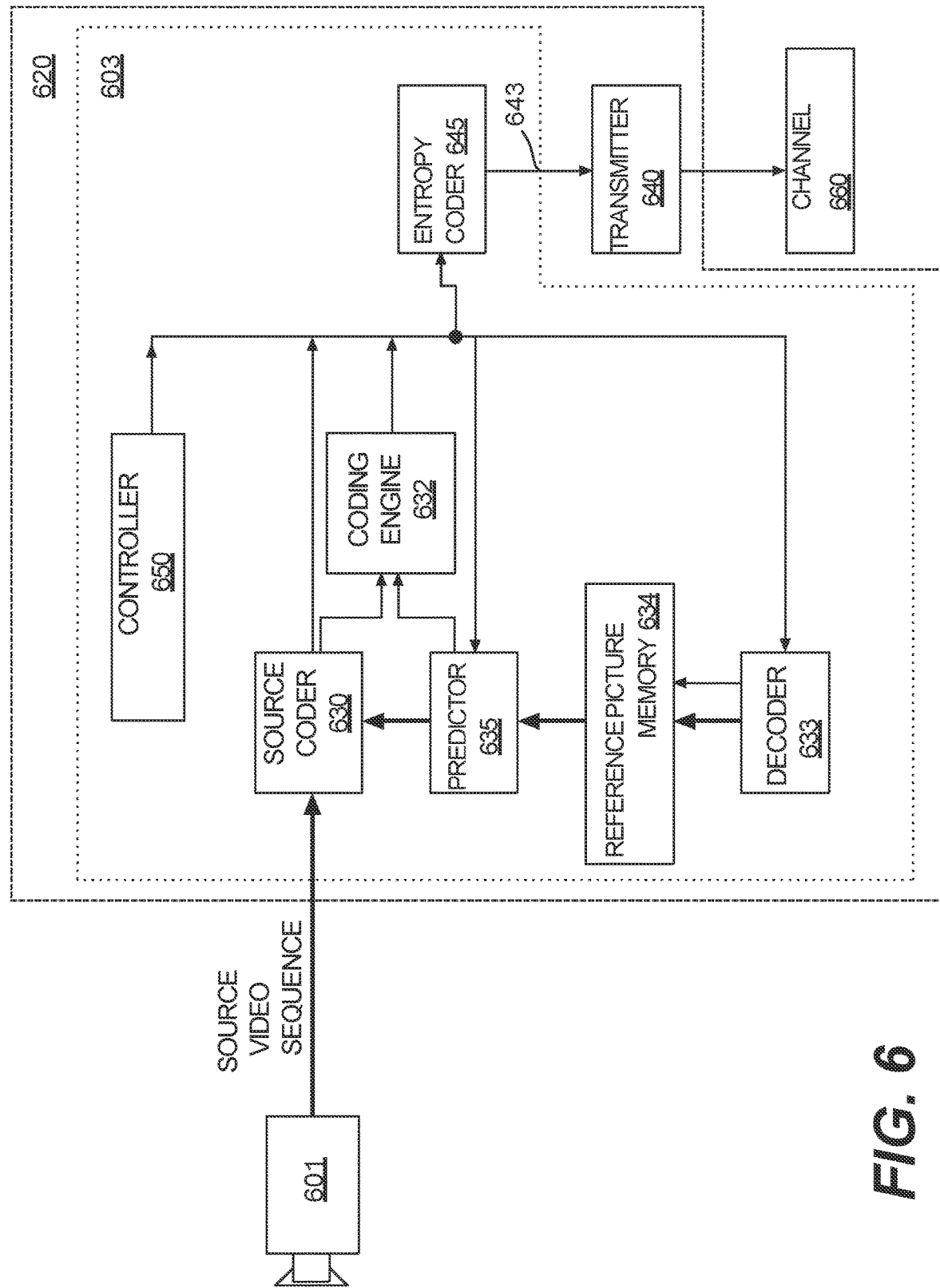
FIG. 6 shows a schematic illustration of a simplified block diagram of a video encoder in accordance with an example embodiment.

FIG. 6 shows a block diagram of a video encoder (603) according to an example embodiment of the present disclosure. The video encoder (603) may be included in an electronic device (620). The electronic device (620) may further include a transmitter (640) (e.g., transmitting circuitry). The video encoder (603) can be used in place of the video encoder (403) in the example of FIG. 4.

The video encoder (603) may receive video samples from a video source (601) (that is not part of the electronic device (620) in the example of FIG. 6) that may capture video image(s) to be coded by the video encoder (603). In another example, the video source (601) may be implemented as a portion of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 YCrCb, RGB, XYZ . . . ), and any suitable sampling structure (for example YCrCb 4:2:0, YCrCb 4:4:4). In a media serving system, the video source (601) may be a storage device capable of storing previously prepared video. In a videoconferencing system, the video source (601) may be a camera that captures local image information as a video sequence. Video data may be provided as a plurality of individual pictures or images that impart motion when viewed in sequence. The pictures themselves may be organized as a spatial array of pixels, wherein each pixel can comprise one or more samples depending on the sampling structure, color space, and the like being in use. A person having ordinary skill in the art can readily understand the relationship between pixels and samples. The description below focuses on samples.

According to some example embodiments, the video encoder (603) may code and compress the pictures of the source video sequence into a coded video sequence (643) in real time or under any other time constraints as required by the application. Enforcing appropriate coding speed constitutes one function of a controller (650). In some embodiments, the controller (650) may be functionally coupled to and control other functional units as described below. The coupling is not depicted for simplicity. Parameters set by the controller (650) can include rate control related parameters (picture skip, quantizer, lambda value of rate-distortion optimization techniques, . . . ), picture size, group of pictures (GOP) layout, maximum motion vector search range, and the like. The controller (650) can be configured to have other suitable functions that pertain to the video encoder (603) optimized for a certain system design.

In some example embodiments, the video encoder (603) may be configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder would create even though the embedded decoder 633 process coded video steam by the source coder 630 without entropy coding (as any compression between symbols and coded video bitstream in entropy coding may be lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used to improve coding quality.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633) in the encoder.

An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (630) may perform motion compensated predictive coding, which codes an input picture predictively with reference to one or more previously coded picture from the video sequence that were designated as "reference pictures." In this manner, the coding engine (632) codes differences (or residue) in the color channels between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end (remote) video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compression of the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person having ordinary skill in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample coding blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures. The source pictures or the intermediate processed pictures may be subdivided into other types of blocks for other purposes. The division of coding blocks and the other types of blocks may or may not follow the same manner, as described in further detail below.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data may accordingly conform to a syntax specified by the video coding technology or standard being used.

In some example embodiments, the transmitter (640) may transmit additional data with the encoded video. The source coder (630) may include such data as part of the coded video sequence. The additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) utilizes spatial correlation in a given picture, and inter-picture prediction utilizes temporal or other correlation between the pictures. For example, a specific picture under encoding/decoding, which is referred to as a current picture, may be partitioned into blocks. A block in the current picture, when similar to a reference block in a previously coded and still buffered reference picture in the video, may be coded by a vector that is referred to as a motion vector. The motion vector points to the reference block in the reference picture, and can have a third dimension identifying the reference picture, in case multiple reference pictures are in use.

In some example embodiments, a bi-prediction technique can be used for inter-picture prediction. According to such bi-prediction technique, two reference pictures, such as a first reference picture and a second reference picture that both proceed the current picture in the video in decoding order (but may be in the past or future, respectively, in display order) are used. A block in the current picture can be coded by a first motion vector that points to a first reference block in the first reference picture, and a second motion vector that points to a second reference block in the second reference picture. The block can be jointly predicted by a combination of the first reference block and the second reference block.

Further, a merge mode technique may be used in the inter-picture prediction to improve coding efficiency.

According to some example embodiments of the disclosure, predictions, such as inter-picture predictions and intra-picture predictions are performed in the unit of blocks. For example, a picture in a sequence of video pictures is partitioned into coding tree units (CTU) for compression, the CTUs in a picture may have the same size, such as 64×64 pixels, 32×32 pixels, or 16×16 pixels. In general, a CTU may include three parallel coding tree blocks (CTBs): one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels. Each of the one or more of the 32×32 block may be further split into 4 CUs of 16×16 pixels. In some example embodiments, each CU may be analyzed during encoding to determine a prediction type for the CU among various prediction types such as an inter prediction type or an intra prediction type. The CU may be split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. The split of a CU into PU (or PBs of different color channels) may be performed in various spatial pattern. A luma or chroma PB, for example, may include a matrix of values (e.g., luma values) for samples, such as 8×8 pixels, 16×16 pixels, 8×16 pixels, 16×8 samples, and the like.

Figure 7:
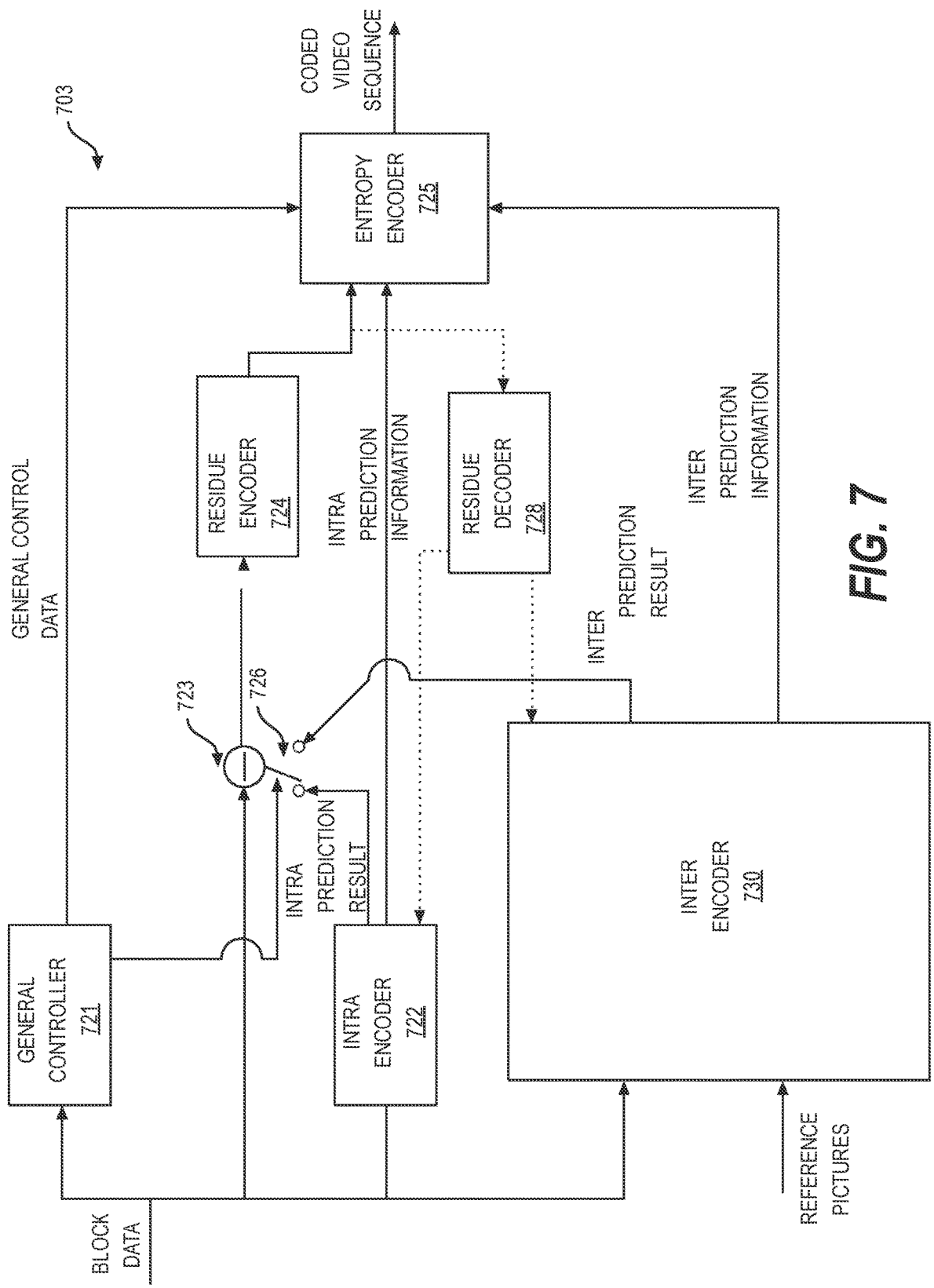
FIG. 7 shows a block diagram of a video encoder in accordance with another example embodiment.

FIG. 7 shows a diagram of a video encoder (703) according to another example embodiment of the disclosure. The video encoder (703) is configured to receive a processing block (e.g., a prediction block) of sample values within a current video picture in a sequence of video pictures, and encode the processing block into a coded picture that is part of a coded video sequence. The example video encoder (703) may be used in place of the video encoder (403) in the FIG. 4 example.

For example, the video encoder (703) receives a matrix of sample values for a processing block, such as a prediction block of 8×8 samples, and the like. The video encoder (703) then determines whether the processing block is best coded using intra mode, inter mode, or bi-prediction mode using, for example, rate-distortion optimization (RDO). When the processing block is determined to be coded in intra mode, the video encoder (703) may use an intra prediction technique to encode the processing block into the coded picture; and when the processing block is determined to be coded in inter mode or bi-prediction mode, the video encoder (703) may use an inter prediction or bi-prediction technique, respectively, to encode the processing block into the coded picture. In some example embodiments, a merge mode may be used as a submode of the inter picture prediction where the motion vector is derived from one or more motion vector predictors without the benefit of a coded motion vector component outside the predictors. In some other example embodiments, a motion vector component applicable to the subject block may be present. Accordingly, the video encoder (703) may include components not explicitly shown in FIG. 7, such as a mode decision module, to determine the perdition mode of the processing blocks.

In the example of FIG. 7, the video encoder (703) includes an inter encoder (730), an intra encoder (722), a residue calculator (723), a switch (726), a residue encoder (724), a general controller (721), and an entropy encoder (725) coupled together as shown in the example arrangement in FIG. 7.

The inter encoder (730) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information using the decoding unit 633 embedded in the example encoder 620 of FIG. 6 (shown as residual decoder 728 of FIG. 7, as described in further detail below).

The intra encoder (722) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques). The intra encoder (722) may calculates intra prediction results (e.g., predicted block) based on the intra prediction information and reference blocks in the same picture.

The general controller (721) may be configured to determine general control data and control other components of the video encoder (703) based on the general control data. In an example, the general controller (721) determines the prediction mode of the block, and provides a control signal to the switch (726) based on the prediction mode. For example, when the prediction mode is the intra mode, the general controller (721) controls the switch (726) to select the intra mode result for use by the residue calculator (723), and controls the entropy encoder (725) to select the intra prediction information and include the intra prediction information in the bitstream; and when the predication mode for the block is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) may be configured to calculate a difference (residue data) between the received block and prediction results for the block selected from the intra encoder (722) or the inter encoder (730). The residue encoder (724) may be configured to encode the residue data to generate transform coefficients. For example, the residue encoder (724) may be configured to convert the residue data from a spatial domain to a frequency domain to generate the transform coefficients. The transform coefficients are then subject to quantization processing to obtain quantized transform coefficients. In various example embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures.

The entropy encoder (725) may be configured to format the bitstream to include the encoded block and perform entropy coding. The entropy encoder (725) is configured to include in the bitstream various information. For example, the entropy encoder (725) may be configured to include the general control data, the selected prediction information (e.g., intra prediction information or inter prediction information), the residue information, and other suitable information in the bitstream. When coding a block in the merge submode of either inter mode or bi-prediction mode, there may be no residue information.

Figure 8:
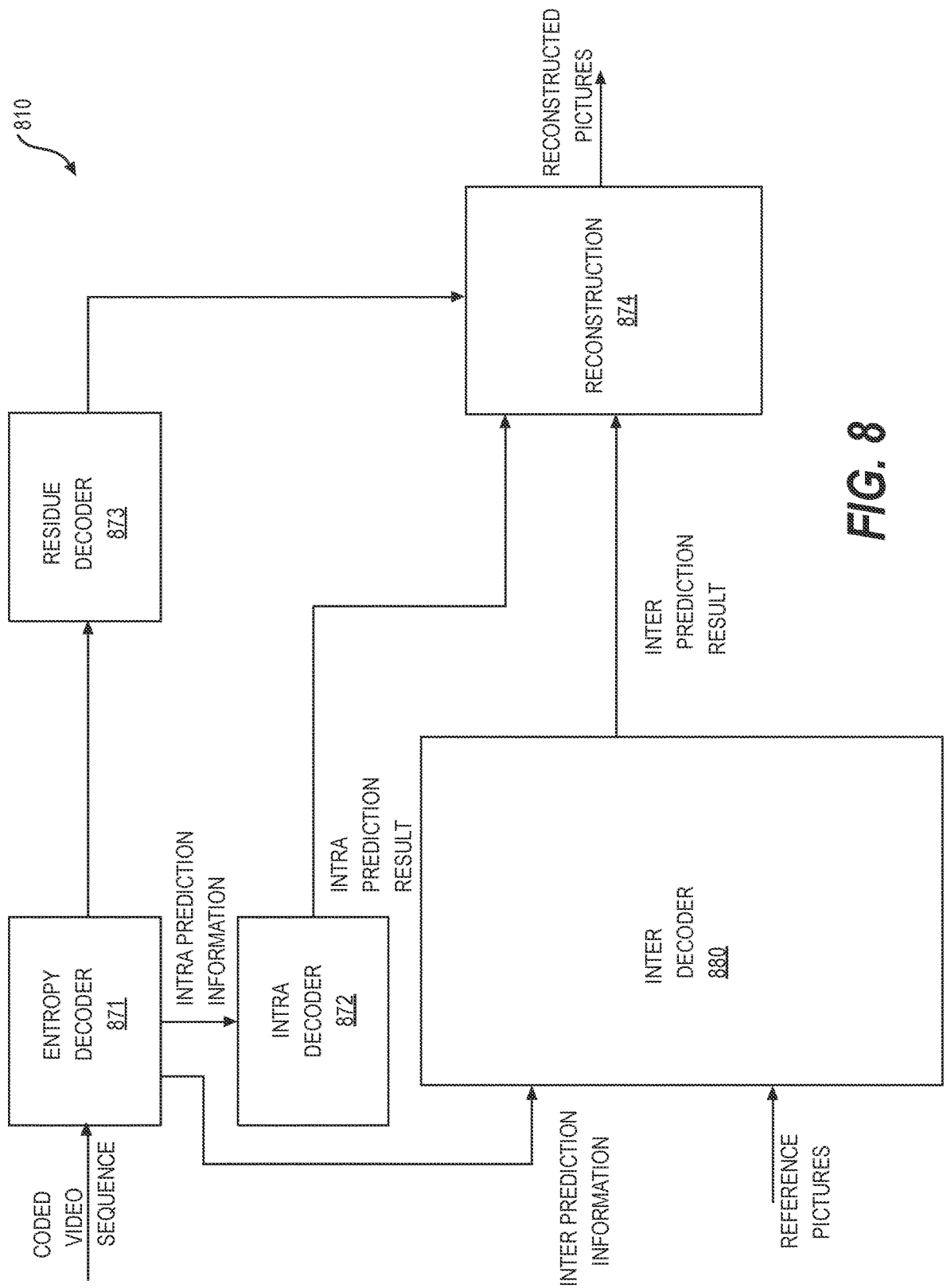
FIG. 8 shows a block diagram of a video decoder in accordance with another example embodiment.

FIG. 8 shows a diagram of an example video decoder (810) according to another embodiment of the disclosure. The video decoder (810) is configured to receive coded pictures that are part of a coded video sequence, and decode the coded pictures to generate reconstructed pictures. In an example, the video decoder (810) may be used in place of the video decoder (410) in the example of FIG. 4.

In the example of FIG. 8, the video decoder (810) includes an entropy decoder (871), an inter decoder (880), a residue decoder (873), a reconstruction module (874), and an intra decoder (872) coupled together as shown in the example arrangement of FIG. 8.

The entropy decoder (871) can be configured to reconstruct, from the coded picture, certain symbols that represent the syntax elements of which the coded picture is made up. Such symbols can include, for example, the mode in which a block is coded (e.g., intra mode, inter mode, bi-predicted mode, merge submode or another submode), prediction information (e.g., intra prediction information or inter prediction information) that can identify certain sample or metadata used for prediction by the intra decoder (872) or the inter decoder (880), residual information in the form of, for example, quantized transform coefficients, and the like. In an example, when the prediction mode is the inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) may be configured to receive the inter prediction information, and generate inter prediction results based on the inter prediction information.

The intra decoder (872) may be configured to receive the intra prediction information, and generate prediction results based on the intra prediction information.

The residue decoder (873) may be configured to perform inverse quantization to extract de-quantized transform coefficients, and process the de-quantized transform coefficients to convert the residual from the frequency domain to the spatial domain. The residue decoder (873) may also utilize certain control information (to include the Quantizer Parameter (QP)) which may be provided by the entropy decoder (871) (data path not depicted as this may be low data volume control information only).

The reconstruction module (874) may be configured to combine, in the spatial domain, the residual as output by the residue decoder (873) and the prediction results (as output by the inter or intra prediction modules as the case may be) to form a reconstructed block forming part of the reconstructed picture as part of the reconstructed video. It is noted that other suitable operations, such as a deblocking operation and the like, may also be performed to improve the visual quality.

It is noted that the video encoders (403), (603), and (703), and the video decoders (410), (510), and (810) can be implemented using any suitable technique. In some example embodiments, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Returning to the intra prediction process, in which samples in a block (e.g., a luma or chroma prediction block, or coding block if not further split into prediction blocks) is predicted by samples of neighboring, next neighboring, or other line or lines, or the combination thereof, to generate a prediction block. The residual between the actual block being coded and the prediction block may then be processed via transform followed by quantization. Various intra prediction modes may be made available and parameters related to intra mode selection and other parameters may be signaled in the bitstream. The various intra prediction modes, for example, may pertain to line position or positions for predicting samples, directions along which prediction samples are selected from predicting line or lines, and other special intra prediction modes.

For example, a set of intra prediction modes (interchangeably referred to as "intra modes") may include a predefined number of directional intra prediction modes. As described above in relation to the example implementation of FIG. 1, these intra prediction modes may correspond to a predefined number of directions along which out-of-block samples are selected as prediction for samples being predicted in a particular block. In another particular example implementation, eight (8) main directional modes corresponding to angles from 45 to 207 degrees to the horizontal axis may be supported and predefined.

Figure 9:
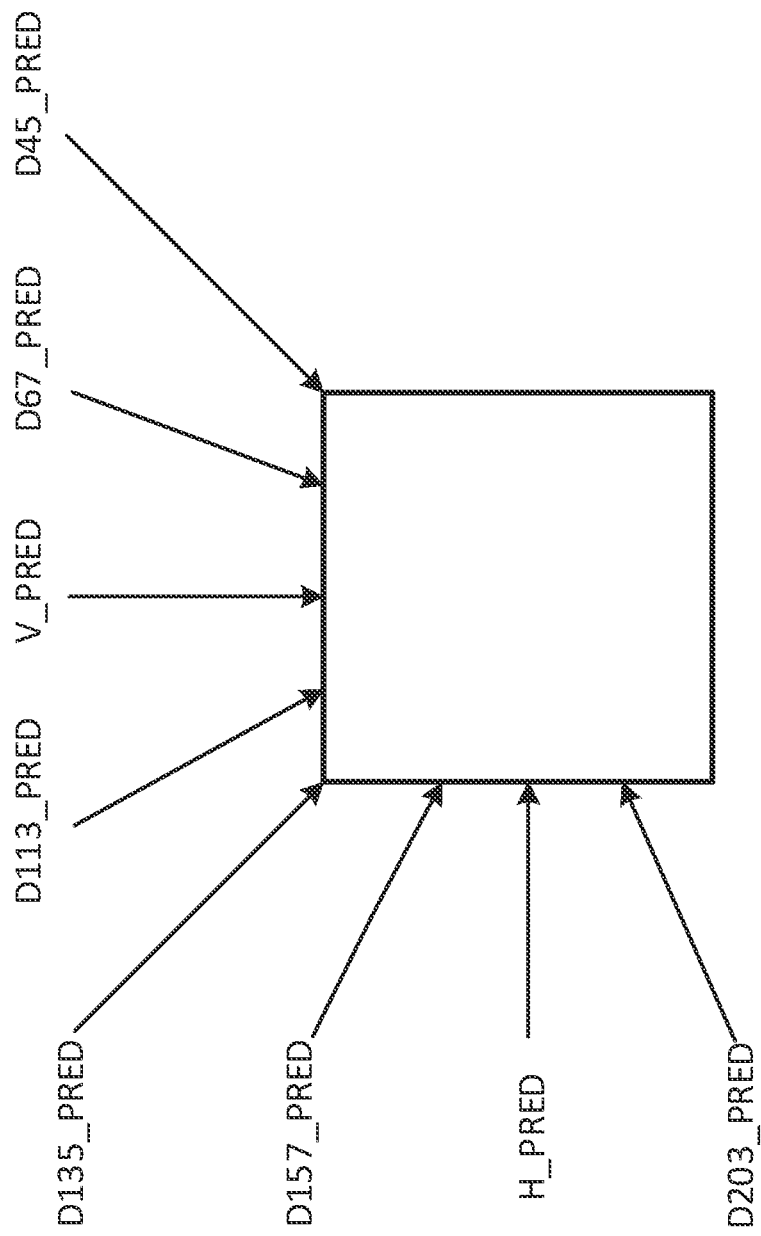
FIG. 9 shows directional intra prediction modes according to example embodiments of the disclosure.

In some other implementations of intra prediction, to further exploit more varieties of spatial redundancy in directional textures, directional intra modes may be further extended to an angle set with finer granularity. For example, the 8-angle implementation above may be configured to provide eight nominal angles, referred to as V_PRED, H_PRED, D45_PRED, D135_PRED, D113_PRED, D157_PRED, D203_PRED, and D67_PRED, as illustrated in FIG. 9, and for each nominal angle, a predefined number (e.g., 7) of finer angles may be added. With such an extension, a larger total number (e.g., 56 in this example) of directional angles may be available for intra prediction, corresponding to the same number of predefined directional intra modes. A prediction angle may be represented by a nominal intra angle plus an angle delta. For the particular example above with 7 finer angular directions for each nominal angle, the angle delta may be −3~3 multiplies a step size of 3 degrees.

The above directional intra prediction may also be referred as single directional intra prediction, which is different from bi-directional intra prediction (also referred as intra bi-prediction) described in later part of the present disclosure.

Figure 10:
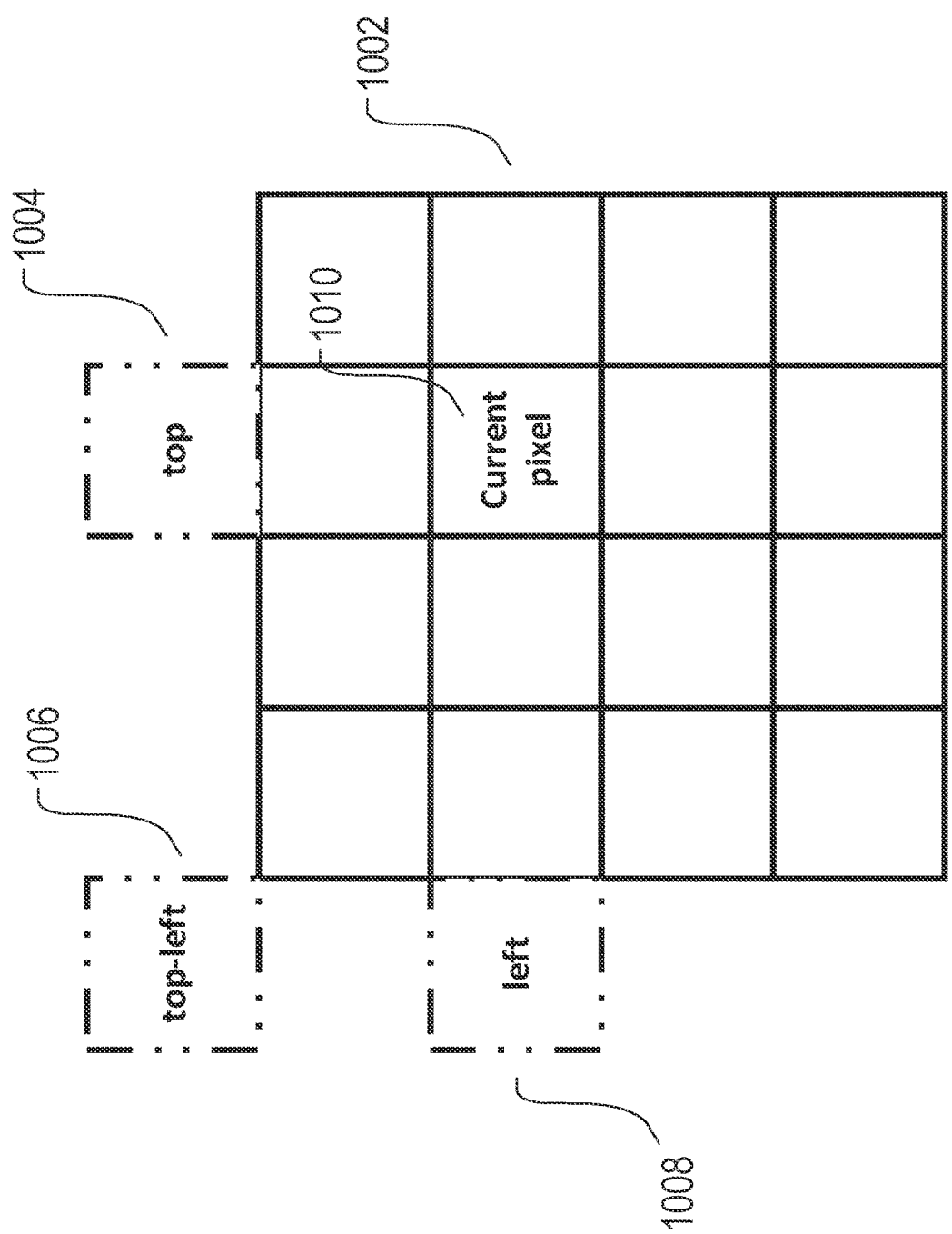
FIG. 10 shows non-directional intra prediction modes according to example embodiments of the disclosure.

In some implementations, alternative or in addition to the direction intra modes above, a predefined number of non-directional intra prediction modes may also be predefined and made available. For example, 5 non-direction intra modes referred to as smooth intra prediction modes may be specified. These non-directional intra mode prediction modes may be specifically referred to as DC, PAETH, SMOOTH, SMOOTH_V, and SMOOTH_H intra modes. Prediction of samples of a particular block under these example non-directional modes are illustrated in FIG. 10. As an example, FIG. 10 shows a 4×4 block 1002 being predicted by samples from a top neighboring line and/or left neighboring line. A particular sample 1010 in block 1002 may correspond to directly top sample 1004 of the sample 1010 in the top neighboring line of block 1002, a top-left sample 1006 of the sample 1010 as the intersection of the top and left neighboring lines, and a directly left sample 1008 of the sample 1010 in the left neighboring line of block 1002. For the example DC intra prediction mode, an average of the left and above neighboring samples 1008 and 1004 may be used as the predictor of the sample 1010. For the example PAETH intra prediction mode, the top, left, and top-left reference samples 1004, 1008, and 1006 may be fetched, and then whichever value among these three reference samples that is the closest to (top+left−topleft) may be set as the predictor for the sample 1010. For the example SMOOTH_V intra prediction mode, the sample 1010 may be predicted by a quadratic interpolation in vertical direction of the top-left neighboring sample 1006 and the left neighboring sample 1008. For the example SMOOTH_H intra prediction mode, the sample 1010 may be predicted by a quadratic interpolation in horizontal direction of the top-left neighboring sample 1006 and the top neighboring sample 1004. For the example SMOOTH intra prediction mode, the sample 1010 may be predicted by an average of the quadratic interpolations in the vertical and the horizontal directions. The non-directional intra mode implementations above are merely illustrated as a non-limiting example. Other neighboring lines, and other non-directional selection of samples, and manners of combining predicting samples for predicting a particular sample in a prediction block are also contemplated.

Selection of a particular intra prediction mode by the encoder from the directional or non-directional modes above at various coding levels (picture, slice, block, unit, etc.) may be signaled in the bitstream. In some example implementations, the exemplary 8 nominal directional modes together with 5 non-angular smooth modes (a total of 13 options) may be signaled first. Then if the signaled mode is one of the 8 nominal angular intra modes, an index is further signaled to indicate the selected angle delta to the corresponding signaled nominal angle. In some other example implementations, all intra prediction modes may be indexed all together (e.g., 56 directional modes plus 5 non-directional modes to yield 61 intra prediction modes) for signaling.

In some example implementations, the example 56 or other number of directional intra prediction modes may be implemented with a unified directional predictor that projects each sample of a block to a reference sub-sample location and interpolates the reference sample by a 2-tap bilinear filter.

Figure 11:
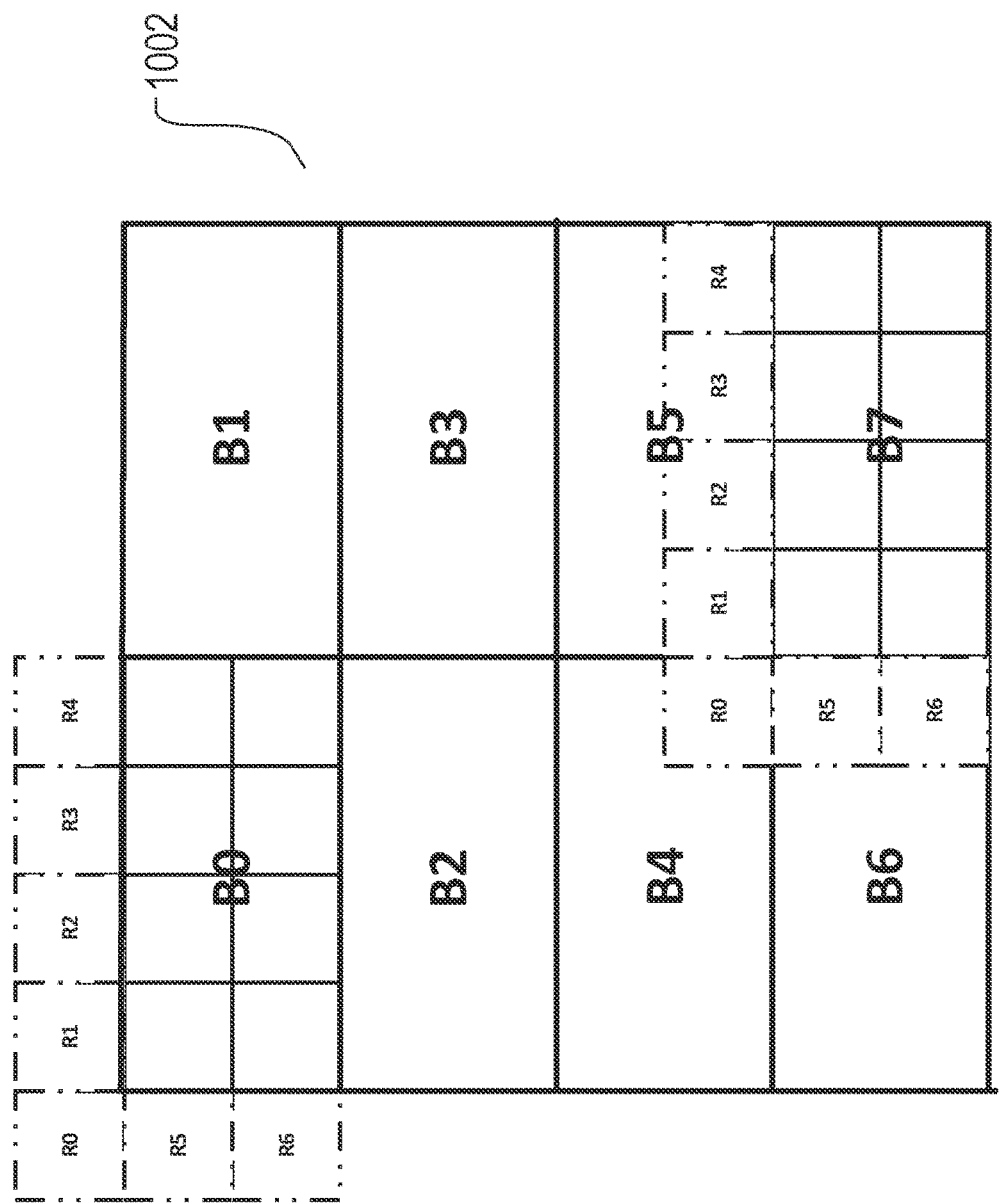
FIG. 11 shows recursive intra prediction modes according to example embodiments of the disclosure.

In some implementations, to capture decaying spatial correlation with references on the edges, additional filter modes referred to as FILTER INTRA modes may be designed. For these modes, predicted samples within the block in addition to out-of-block samples may be used as intra prediction reference samples for some patches within the block. These modes, for example, may be predefined and made available to intra prediction for at least luma blocks (or only luma blocks). A predefined number (e.g., five) of filter intra modes may be pre-designed, each represented by a set of n-tap filters (e.g., 7-tap filters) reflecting correlation between samples in, for example, a 4×2 patch and n neighbors adjacent to it. In other words, the weighting factors for an n-tap filter may be position dependent. Taking an 8×8 block, 4×2 patch, and 7-tap filtering as an example, as shown in FIG. 11, the 8×8 block 1102 may be split into eight 4×2 patches. These patches are indicated by B0, B1, B1, B3, B4, B5, B6, and B7 in FIG. 11. For each patch, its 7 neighbors, indicated by R0~R7 in FIG. 11, may be used to predict the samples in a current patch. For patch B0, all the neighbors may have been already reconstructed. But for other patches, some of the neighbors are in the current block and thus may not have been reconstructed, then the predicted values of immediate neighbors are used as the reference. For example, all the neighbors of patch B7 as indicated in FIG. 11 are not reconstructed, so the prediction samples of neighbors, for example a portion of B4, B5, and/or B6, are used instead.

In some implementation of intra prediction, one color component may be predicted using one or more other color components. A color component may be any one of components in YCrCb, RGB, XYZ color space and the like. For example, a prediction of chroma component (e.g., chroma block) from luma component (e.g., luma reference samples), referred to as Chroma from Luma, or CfL), may be implemented. In some example implementations, cross-color prediction many only be allowed from luma to chroma. For example, a chroma sample in a chroma block may be modeled as a linear function of coincident reconstructed luma samples. The CfL prediction may be implemented as follows:

$$CfL(\alpha) = \alpha \times L^{AC} + DC \tag{1}$$

where $L^{AC}$ denotes an AC contribution of luma component, $\alpha$ denotes a parameter of the linear model, and DC denotes a DC contribution of the chroma component. The AC components, for example is obtained for each samples of the block whereas the DC component is obtained for the entire block. To be specific, the reconstructed luma samples may be subsampled into the chroma resolution, and then the average luma value (DC of luma) may be subtracted from each luma value to form the AC contribution in luma. The AC contribution of Luma is then used in the linear mode of Eq. (1) to predict the AC values of the chroma component. To approximate or predict chroma AC component from the luma AC contribution, instead of requiring the decoder to calculate the scaling parameters, an example CfL implementation may determine the parameter α based on the original chroma samples and signal them in the bitstream. This reduces decoder complexity and yields more precise predictions. As for the DC contribution of the chroma component, it may be computed using intra DC mode within the chroma component in some example implementations.

Figure 1A:
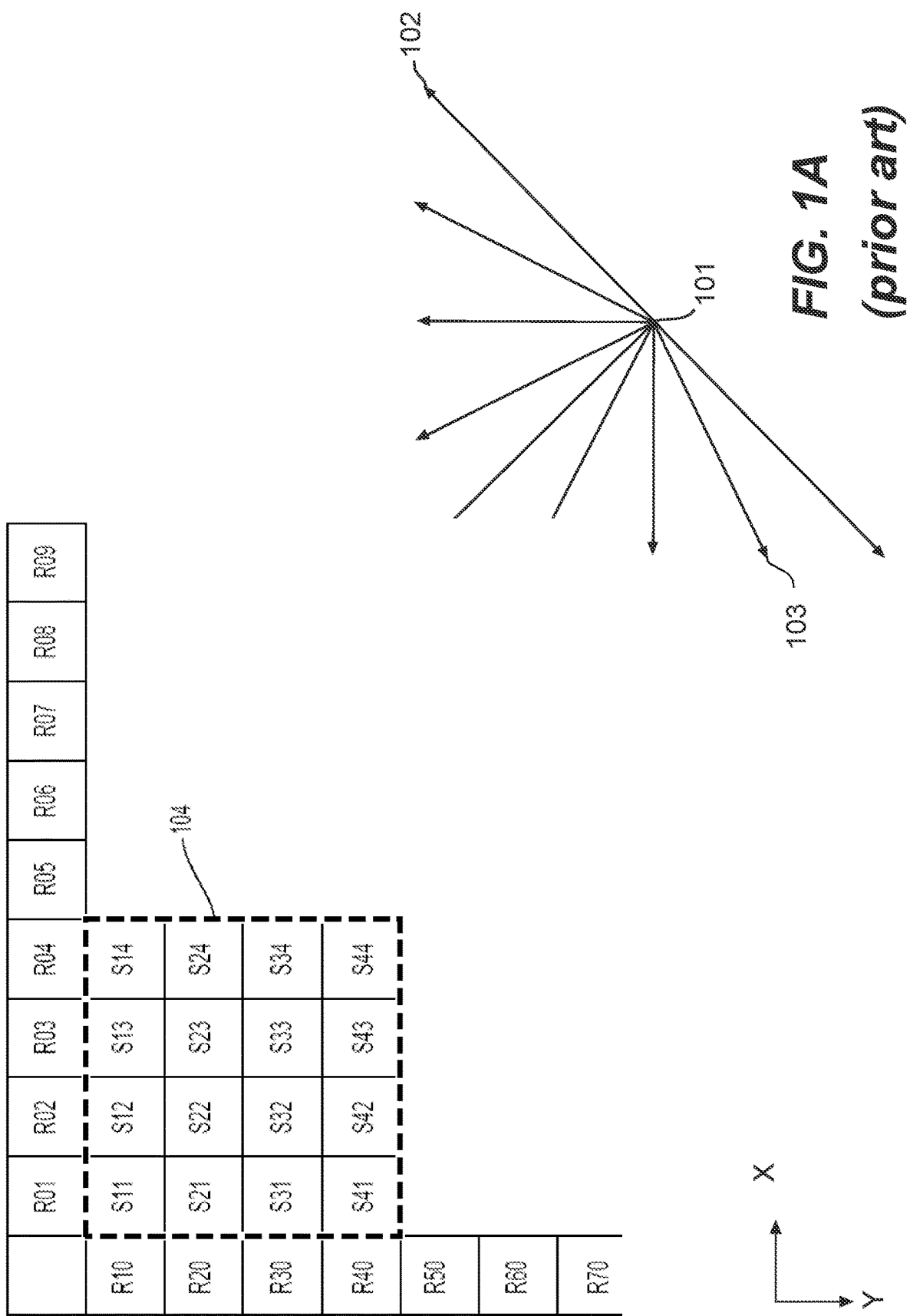
FIG. 1A shows a schematic illustration of an exemplary subset of intra prediction directional modes.
Figure 1B:
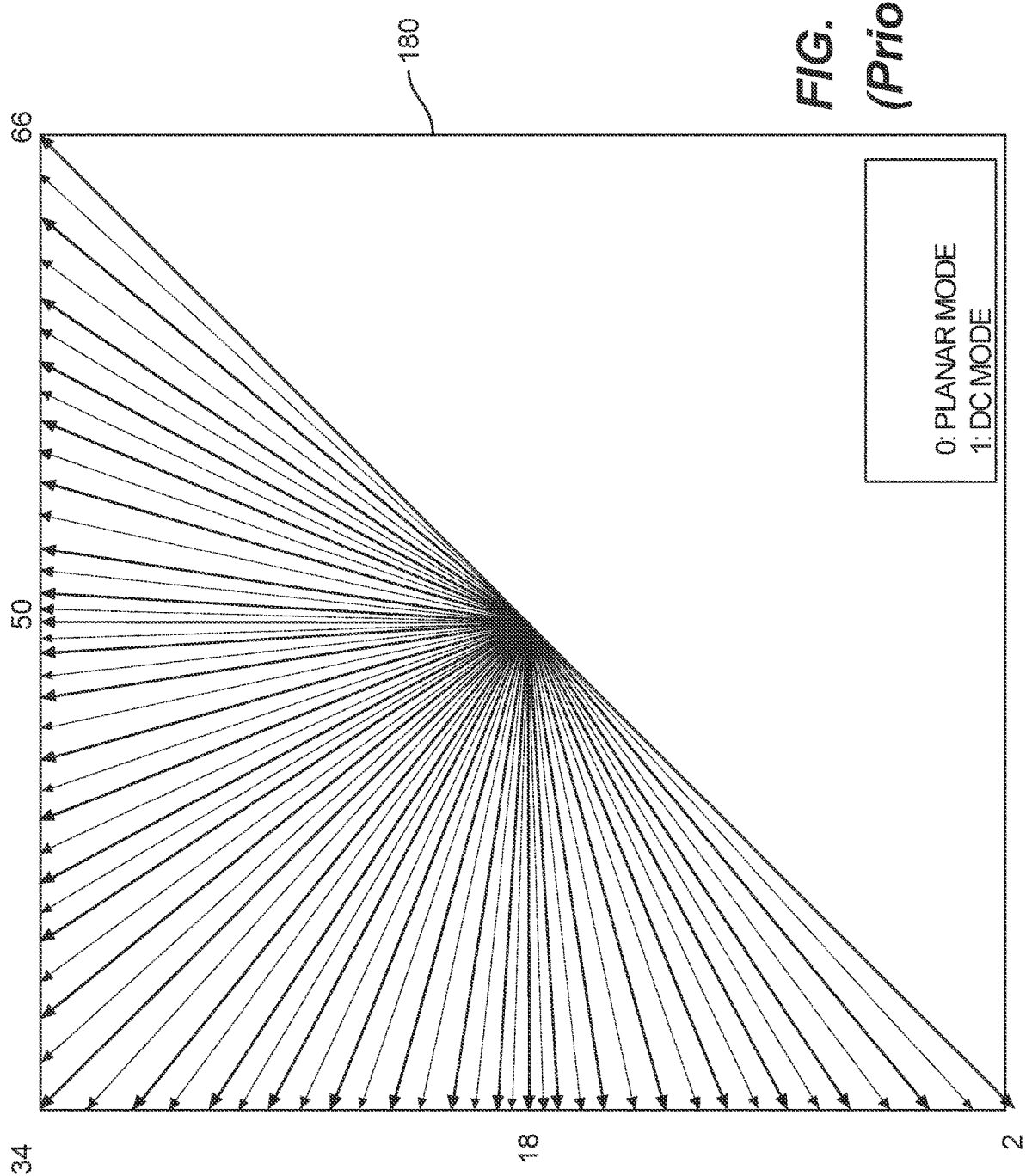
FIG. 1B shows an illustration of exemplary intra prediction directions.
Figure 2:
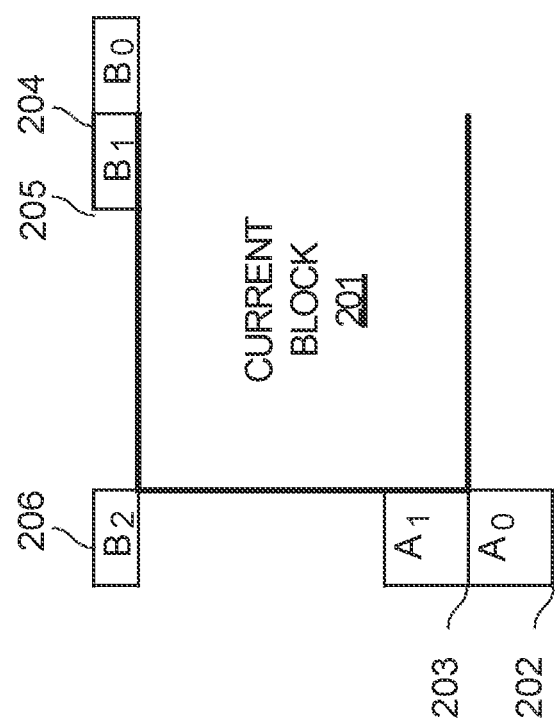
FIG. 2 shows a schematic illustration of a current block and its surrounding spatial merge candidates for motion vector prediction in one example.

Turning back to intra prediction, in some example implementations, prediction of samples in a coding block or prediction block may be based on one of a set of reference lines. In other words, rather than always using a nearest neighboring line (e.g., the immediate top neighboring line or the immediate left neighboring line of the prediction block as illustrated in FIG. 1 above), multiple reference lines may be provided as options for selection for intra prediction. Such intra prediction implementations may be referred to as Multiple Reference Line Selection (MRLS). In these implementations, an encoder decides and signals which reference line of a plurality of reference lines is used to generate the intra predictor. At the decoder side, after parsing the reference line index, the intra prediction of current intra-prediction block can be generated by identifying the reconstructed reference samples by looking up the specified reference line according to the intra prediction mode (such the directional, non-directional, and other intra-prediction modes). In some implementations, a reference line index may be signaled in the coding block level and only one of the multiple reference lines may be selected and used for intra prediction of one coding block. In some examples, more than one reference lines may be selected together for intra-prediction. For example, the more than one reference lines may be combined, averaged, interpolated or in any other manner, with or without weight, to generate the prediction. In some example implementations, MRLS may only be applied to luma component and may not be applied to chroma component(s).

Figure 12:
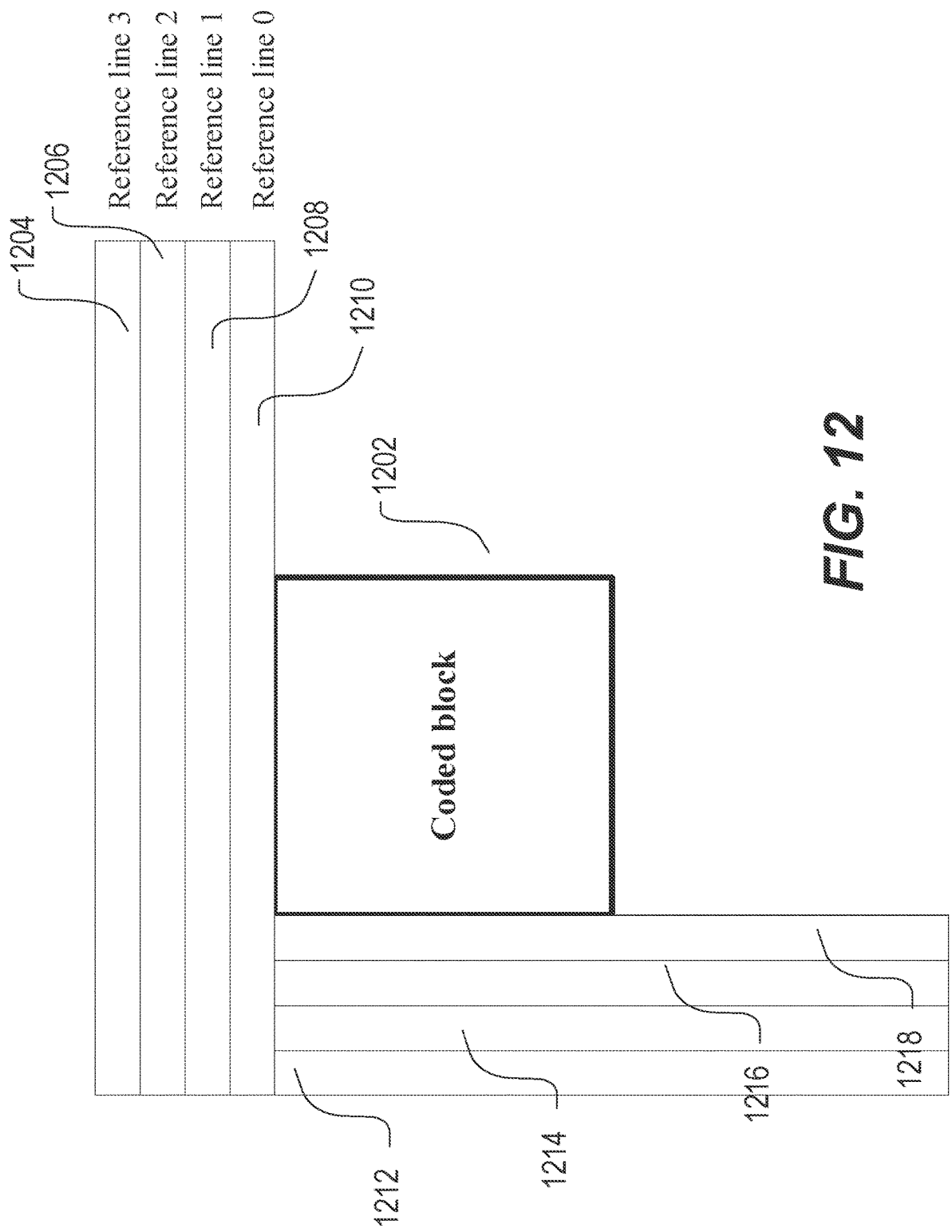
FIG. 12 shows an intra prediction scheme based on various reference lines according to example embodiments of the disclosure.

In FIG. 12, an example of 4 reference-line MRLS is depicted. As shown in the example of FIG. 12, the intra-coding block 1202 may be predicted based on one of the 4 horizontal reference lines 1204, 1206, 1208, and 1210 and 4 vertical reference lines 1212, 1214, 1216, and 1218. Among these reference lines, 1210 and 1218 are the immediate neighboring reference lines. The reference lines may be indexed according to their distance from the coding block. For example, reference lines 1210 and 1218 may be referred to as zero reference line whereas the other reference lines may be referred to as non-zero reference lines. Specifically, reference lines 1208 and 1216 may be reference as $1^{st}$ reference lines; reference lines 1206 and 1214 may be reference as 2nd reference lines; and reference lines 1204 and 1212 may be reference as 3rd reference lines.

In addition to the single directional intra prediction described in the earlier part of the present disclosure, two reference pixels along a prediction direction may be used in a combination manner to achieve the directional predictor, which may be referred as bi-directional intra prediction, or intra bi-prediction (IBP).

In some implementations, for a current block (e.g., a coding block or a coded block), IBP may be applicable to a directional mode when the direction mode has an angle smaller than 90 degree, for example but not limited to, the D67_PRED and D45_PRED in FIG. 9. In some other implementation, IBP may be also applicable to a directional mode when the direction mode has an angle larger than 180 degree, for example but not limited to, the D203_PRED in FIG. 9.

When intra bi-prediction is applied, two reference pixels along the direction of the direction mode are selected: one reference pixel is from a top or top right of the current block, and the other pixel is from a left or lower left of the current block. a weighted average of the two reference pixels may be calculated to achieve the predictor.

Figure 13A:
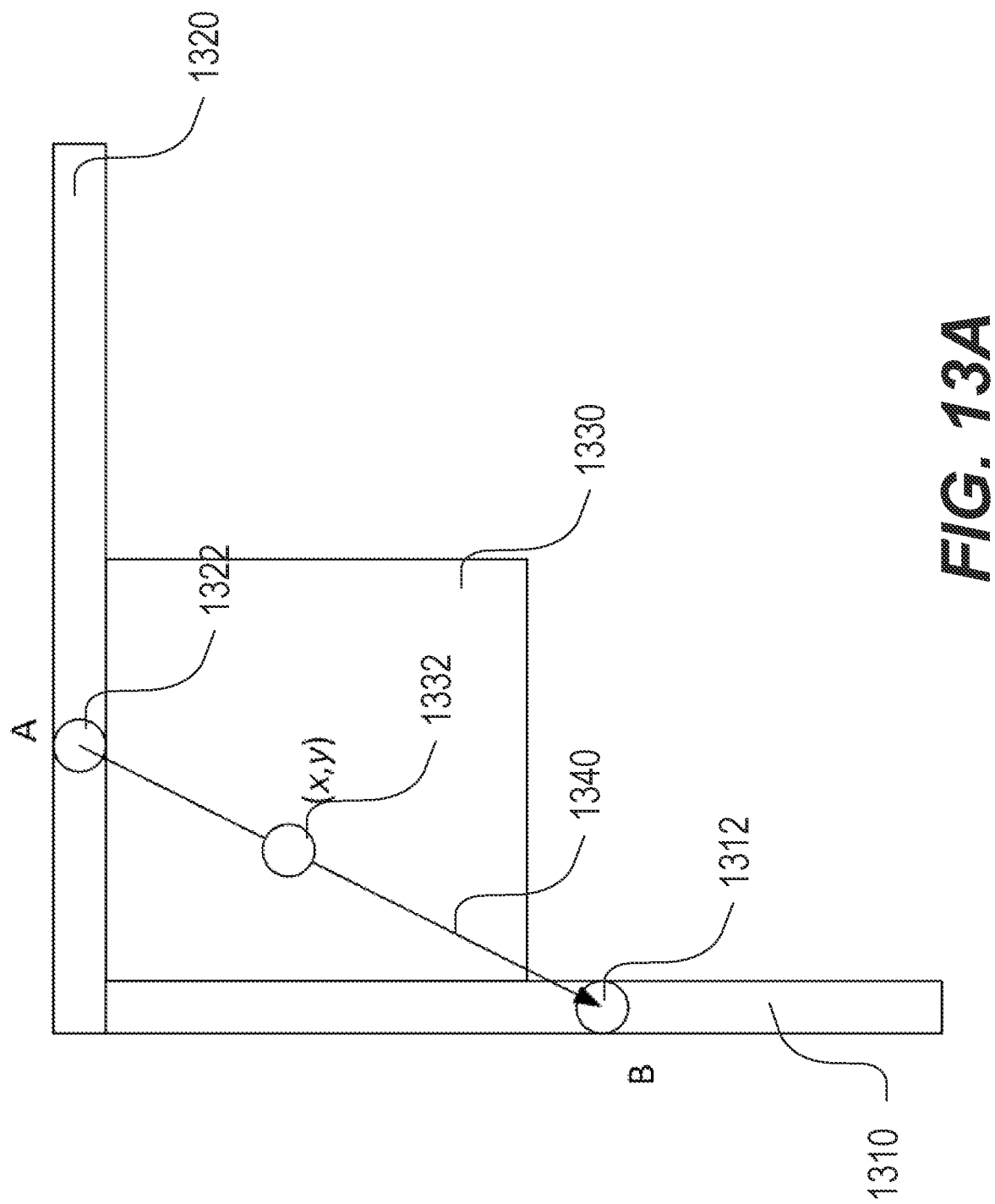
FIG. 13A shows an intra bi-prediction according to example embodiments of the disclosure.

FIG. 13A shows an example of IBP for a coded block (1330) with a direction mode having a prediction direction (1340) from A (1322) to B (1312). A and B are two reference samples/values, which are also referred as a first predictor and a second predictor. A is at a cross of the direction (1340) and a top reference line (1320); and B is at a cross of the direction (1340) and a left reference line (1310). The prediction for a pixel (x,y) (1332), which is a pixel in the coded block (1330), is denoted as pred(x,y). pred(x,y) may be generated with the weighted combination of the two predictors A and B, as shown in Eq. (2).

$$\mathrm{Pred}(x,y) = w*A + (1-w)*B \quad (2)$$

A and/or B may be derived with a directional prediction process which includes interpolation for fractional-pixel reference. FIG. 13B shows another example of IBP for the coded block (1330) with a different direction mode having a different prediction direction (1350) from A (1314) to B (1324).

In some implementations wherein IBP is applied, two reference pixels located at the adjacent above reference line and adjacent left reference along the direction are weighted to achieve the predictor. Both IBP and multiple reference line selection (MRLS) may be applied to a coded block, resulting in some issues/problems. For example, one issue/problem may include how to apply IBP to the current block when one or more reference samples in one or more non-adjacent reference lines are selected.

The present disclosure describes various embodiment for signaling and/or determining multiple reference line intra prediction in video coding and/or decoding, addressing at least one of the issues/problems discussed above.

Figure 14:
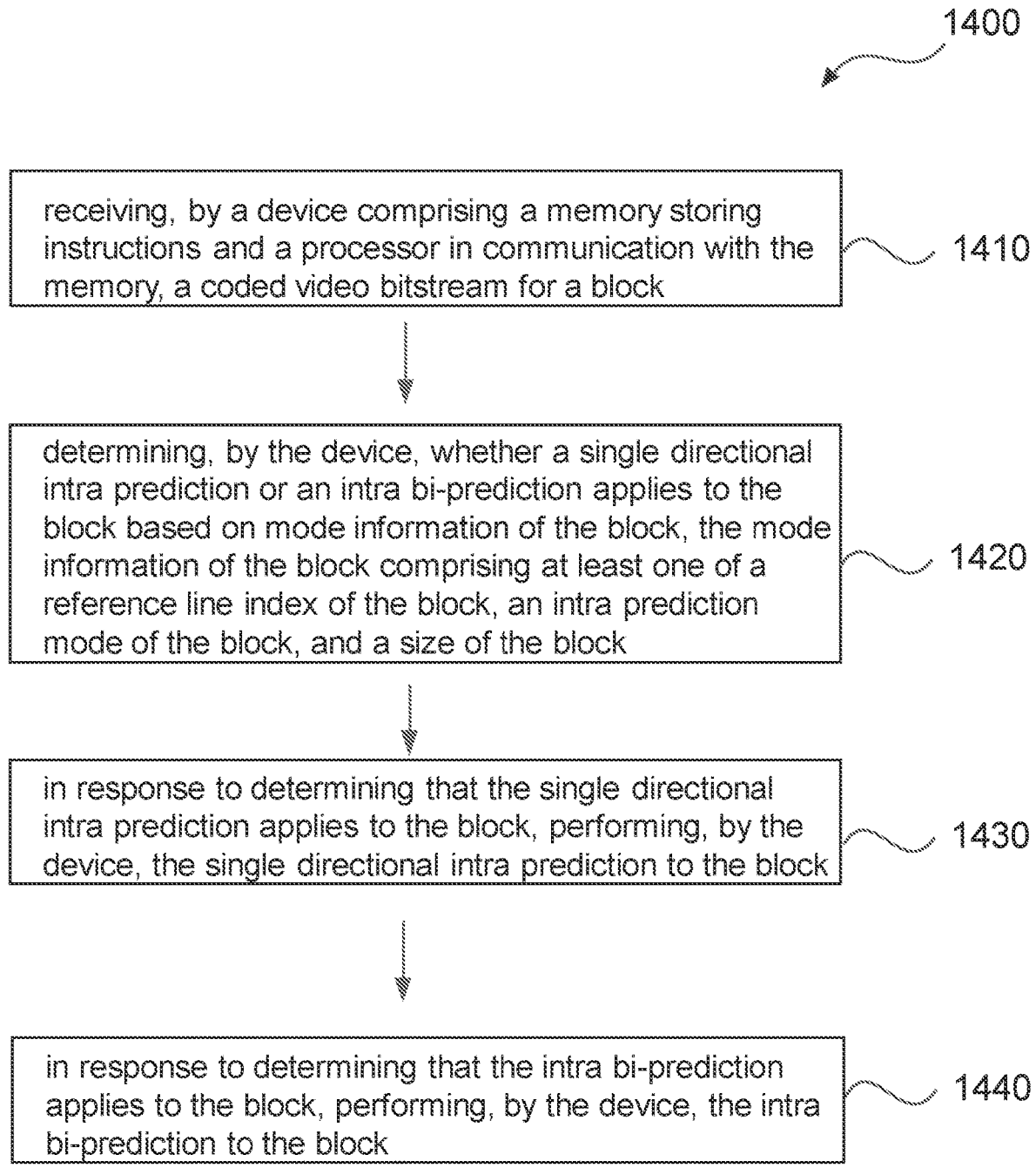
FIG. 14 shows a flow diagram of a method according to an example embodiment of the disclosure.

In various embodiment, referring to FIG. 14, a method 1400 for intra bi-prediction and multiple reference line intra prediction in video decoding. The method 1400 may include a portion or all of the following steps: step 1410, receiving, by a device comprising a memory storing instructions and a processor in communication with the memory, a coded video bitstream for a block; step 1420, determining, by the device, whether a single directional intra prediction or an intra bi-prediction applies to the block based on mode information of the block, the mode information of the block comprising at least one of a reference line index of the block, an intra prediction mode of the block, and a size of the block; step 1430, in response to determining that the single directional intra prediction applies to the block, performing, by the device, the single directional intra prediction to the block; and/or step 1440, in response to determining that the intra bi-prediction applies to the block, performing, by the device, the intra bi-prediction to the block. In some implementations, step 1420 may include determining, by the device, whether single directional intra prediction or intra bi-prediction applies to the block, based on mode information of the block, the mode information of the block comprising at least one of the following: a reference line index of the block, an intra prediction mode of the block, or a size of the block.

In some implementations, when an intra prediction mode does not belong to one of the smooth modes as discussed above or when an intra prediction mode generates one or more prediction sample according to a given prediction direction, this intra prediction mode may be categorized as one of directional modes, and/or this intra prediction mode may be referred as a directional intra prediction mode (or directional mode).

In various embodiments in the present disclosure, a size of a block (for example but not limited to, a coding block, a prediction block, or a transform block) may refer to a width or a height of the block. The width or the height of the block may be an integer in a unit of pixels.

In various embodiments in the present disclosure, a size of a block (for example but not limited to, a coding block, a prediction block, or a transform block) may refer to an area size of the block. The area size of the block may be an integer calculated by the width of the block multiplied by the height of the bock in a unit of pixels.

In some various embodiments in the present disclosure, a size of a block (for example but not limited to, a coding block, a prediction block, or a transform block) may refer to a maximum value of a width or a height of the block, a minimum value of a width or a height of the block, or an aspect ratio of the block. The aspect ratio of the block may be calculated as the width divided by the height of the block, or may be calculated as the height divided by the width of the block.

In the present disclosure, a reference line index indicates a reference line among multiple reference lines. In various embodiments, the reference line index being 0 for a block may indicate the adjacent reference line to the block, which is also the nearest reference line to the block. For example, referring to a block (1202) in FIG. 12, a top reference line (1210) is a top adjacent reference line to the block (1202), which is also a top nearest reference line to the block; and a left reference line (1218) is a left adjacent reference line to the block (1202), which is also a left nearest reference line to the block. A reference line index being greater than 0 for a block indicates a non-adjacent reference line of the block, which is also the non-nearest reference line to the block. For example, referring to a block (1202) in FIG. 12, a reference line index being 1 may indicate a top reference line (1208) and/or a left reference line (1216); a reference line index being 2 may indicate a top reference line (1206) and/or a left reference line (1214); and/or a reference line index being 3 may indicate a top reference line (1204) and/or a left reference line (1212).

Referring to step 1410, the device may be the electronic device (530) in FIG. 5 or the video decoder (810) in FIG. 8. In some implementations, the device may be the decoder (633) in the encoder (620) in FIG. 6. In other implementations, the device may be a portion of the electronic device (530) in FIG. 5, a portion of the video decoder (810) in FIG. 8, or a portion of the decoder (633) in the encoder (620) in FIG. 6. The coded video bitstream may be the coded video sequence in FIG. 8, or an intermediate coded data in FIG. 6 or 7. The block may refer to a coding block or a coded block.

In some implementations, when a directional intra prediction mode is selected for a block to generate an intra predictor from samples at the non-adjacent reference lines, whether a single directional intra prediction or an intra bi-prediction is applied to the block may be determined, and this determination may depend on mode information of the block. In some implementations, the mode information of the block may include but not limited to, a reference line index (e.g., indicating which reference line among multiple reference lines), one or more intra prediction angles (e.g., indicating which directional intra prediction mode among multiple directional intra predication modes), and/or a size of the block.

Referring to step 1420, the device may determine whether single directional intra prediction or intra bi-prediction applies to the block, based on the mode information of the block. In some implementations, step 1420 may include, in response to the reference line index of the block indicating a non-adjacent reference line, determining that the single directional intra prediction applies to the block. As one example, a single directional intra prediction may be applied to non-adjacent reference lines regardless of the intra prediction angles of a current block.

In various embodiments, step 1420 may include, in response to the reference line index of the block indicating an adjacent reference line, determining that the intra bi-prediction applies to the block. As one example, an intra bi-prediction may only be applied to an adjacent reference line for a current block.

In various embodiments, step 1420 may include, in response to the reference line index of the block being greater than a predefined threshold, determining that the single directional intra prediction applies to the block; and/or in response to the reference line index of the block not being greater than the predefined threshold, determining that the intra bi-prediction applies to the block. As one example, the determination on whether single directional intra prediction or intra bi-prediction is applied to non-adjacent reference lines, and this determination also depends on whether the value of reference line index is greater than a predefined value N. N is a non-negative integer, for example 0, 1, 2, 3, or 4.

In one example, the predefined value N is 0. The single directional intra prediction applies to the block when the value of reference line index for the block is greater than 0, i.e., when any non-adjacent reference line (e.g., any line of 1212, 1214, 1216, 1204, 1206, and/or 1208 in FIG. 12) is used for the block; and/or the intra bi-prediction applies to the block when the value of reference line index for the block is not greater than 0, i.e., when an adjacent reference line (e.g., any line of 1218 and/or 1210 in FIG. 12) is used for the block.

In another example, the predefined value N is 1. The single directional intra prediction applies to the block when the value of reference line index for the block is greater than 1, i.e., when any of a first subset of non-adjacent reference lines (e.g., any line of 1212, 1214, 1204, and/or 1206 in FIG. 12) is used for the block; and/or the intra bi-prediction applies to the block when the value of reference line index for the block is not greater than 1, i.e., when an adjacent reference line (e.g., any line of 1218 and/or 1210 in FIG. 12) and/or any of a second subset of non-adjacent reference lines (e.g., any line of 1208 and/or 1216 in FIG. 12) is used for the block.

In various embodiments, step 1420 may include, in response to the intra prediction mode of the block belonging to a first selected set of intra prediction modes and the reference line index indicating an adjacent reference line, determining that the intra bi-prediction applies to the block; in response to the intra prediction mode of the block belonging to the first selected set of intra prediction modes and the reference line index indicating a non-adjacent reference line, determining that the single directional intra prediction applies to the block; and/or in response to the intra prediction mode of the block belonging to a second selected set of intra prediction modes, determining that the intra bi-prediction applies to the block. In some implementations, the first selected set of intra prediction modes does not overlap with the second selected set of intra prediction modes. In some other implementations, the second selected set of intra prediction modes may include a diagonal intra prediction mode.

In some implementations, for a selected set of intra prediction modes, IBP is applied for both adjacent and non-adjacent reference lines, while for the remaining set of intra prediction modes, IBP is only applied for adjacent reference lines. In some other implementations, the selected set of intra prediction modes may include several intra prediction modes with some specific direction angles, so that only integer samples are used as reference values for intra prediction. For one example, only integer samples are used as reference values for some intra prediction modes having a diagonal direction (i.e., 45 degrees or 225 degrees). For another example, when the intra prediction is applied by only using integer samples for diagonal intra prediction modes, IBP may be applied for non-adjacent reference lines as well, wherein the diagonal intra prediction mode is a intra prediction mode having a diagonal direction (i.e., 45 degrees or 225 degrees).

In various embodiments, step 1420 may include, in response to the reference line index of the block being an odd integer and/or the reference line index indicating a non-adjacent reference line, determining that the single directional intra prediction applies to the block; and/or in response to the reference line index of the block being an even integer and/or the reference line index indicating an adjacent reference line, determining that the intra bi-prediction applies to the block.

In some implementations, the determination on whether single directional intra prediction or intra bi-prediction is applied to non-adjacent reference lines, and the determination depends on whether a value of reference line index is an even number or an odd number. For one example, when the value of reference line index for a block is an odd number, a single directional intra prediction is applied to the block; and/or when the value of reference line index for the block is an even number, an intra bi-prediction is applied to the block. For another example, when the value of reference line index for a block is an even number, a single directional intra prediction is applied to the block; and/or when the value of reference line index for the block is an odd number, an intra bi-prediction is applied to the block.

In various embodiments, there may be only one reference line index for a block. During encoding, the reference line index for the block may be encoded into the coded bitstream; and/or during decoding, the reference line index for the block may be decoded/extracted from the coded bitstream. The step 1440 may include, determining a first predictor based on the reference line index of the block; determining a second predictor based on the reference line index of the block; and/or determining a final predictor for the block according to a weighted calculation between the first predictor and the second predictor.

In some implementations, when intra bi-prediction is applied and the reference line index for the block indicating to use non-adjacent reference lines for intra prediction, to generate the intra predictor from samples at the non-adjacent reference lines, both predictor A and predictor B are generated from the samples at non-adjacent reference lines, and then a weighted calculation is performed based on predictor A and predictor B to generate the final IBP predictor.

In various embodiments, there may be more than one reference line indexes for a block. A first reference line index may indicate a reference line to use among multiple top reference lines and a second reference line index may indicate a reference line to use among multiple left reference lines; or vice versa, a first reference line index may indicate a reference line to use among multiple left reference lines and a second reference line index may indicate a reference line to use among multiple top reference lines. During encoding, the more than one reference line indexes for the block may be encoded into the coded bitstream; and/or during decoding, the more than one reference line indexes for the block may be decoded/extracted from the coded bitstream.

In some implementations, the step 1440 may include, determining a first predictor based on a first reference line index of the block; determining a second predictor based on a second reference line index of the block; and/or determining a final predictor for the block according to a weighted calculation between the first predictor and the second predictor.

In some other implementations, the first reference line index indicates a non-adjacent reference line, and the first predictor is generated from a first sample at the non-adjacent reference line; and/or the second reference line index indicates an adjacent reference line, and the second predictor is generated from a second sample at the adjacent reference line.

Figure 15:
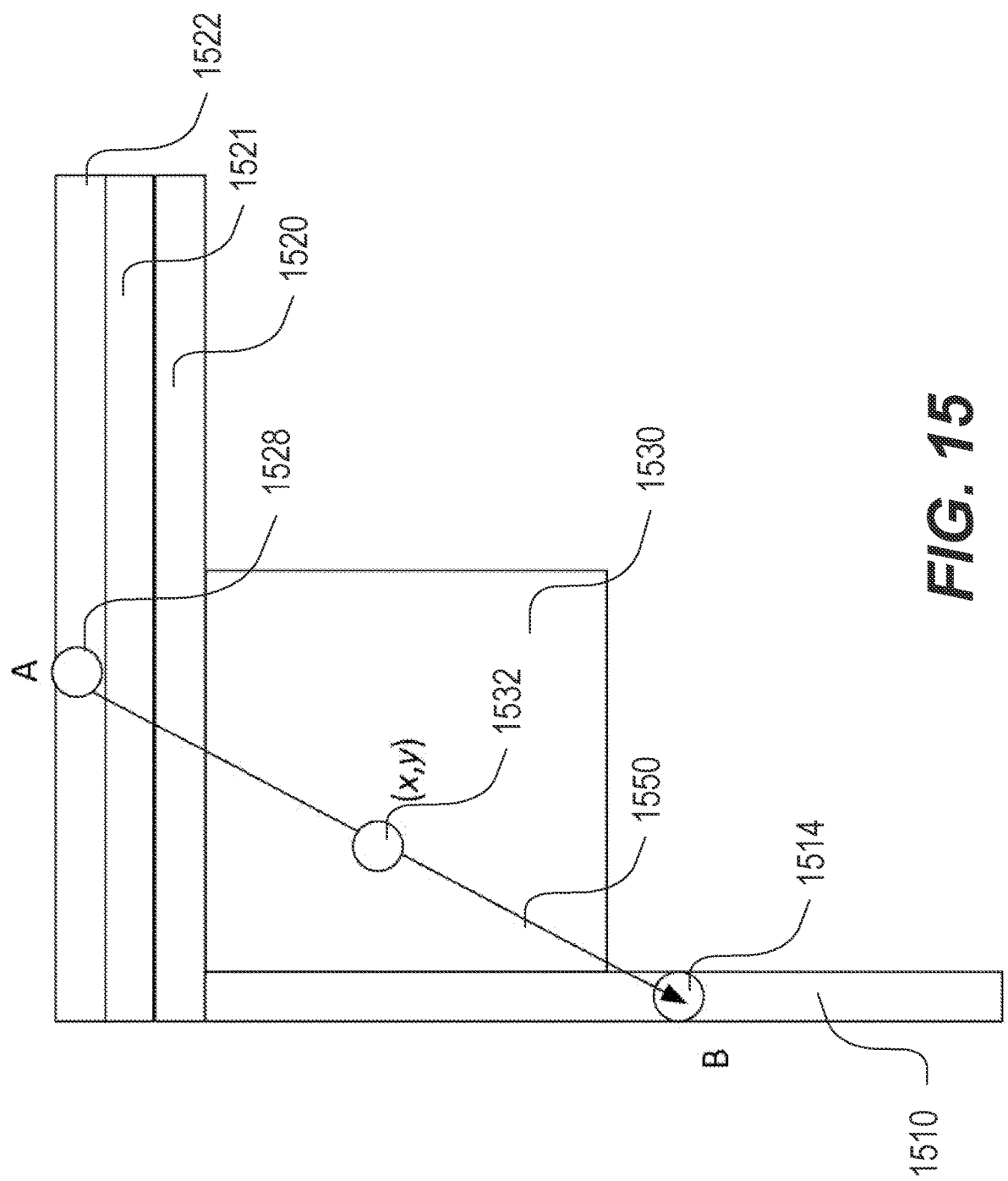
FIG. 15 shows an intra bi-prediction based on multiple reference lines according to example embodiments of the disclosure.

In one example referring to FIG. 15, when intra bi-prediction is applied to a coded block (1530), to generate an intra predictor (1532) from samples at two reference lines including one non-adjacent reference line and/or one or more adjacent reference line. As shown in FIG. 15, the coded block has a left adjacent reference line (1510), a top adjacent reference line (1520), and at least one top adjacent reference line (1521 and/or 1522). For example but without limitation, a first reference line index being 2 may indicate the top non-adjacent reference line (1522), so that Predictor A (1528) is generated from the samples at the non-adjacent reference line (1522) selected by MRLS according to the prediction direction (1550). In some implementation, a second reference line index being 0 may indicate the left adjacent reference line (1510). In some other implementations, the left adjacent reference line (1510) may be indicated/implied without the second reference line index. Predictor B (1514) is generated from the samples at the adjacent reference line (1510) according to the prediction direction (1550). Then predictor A and predictor B is weighted combined to generate the intra predictor (1532) following the IBP scheme, for example, following the formula in Eq. (2). In some implementations, the weight (w) may depend on the distance between the intra predictor (1532) and either Predictor A or Predictor B. In Eq. (2), the smaller the distance between the intra predictor (1532) and Predictor A (1528) (i.e., the closer the predictor (1532) to Predictor A (1528)), the bigger the weight (w) is. Similarly, in Eq. (2), the larger the distance between the intra predictor (1532) and Predictor A (1528) (i.e., the further the predictor (1532) to Predictor A (1528)), the smaller the weight (w) is.

FIG. 15 illustrates an example with a single left reference line and multiple top reference lines; and similarly, in another example, a single top reference line and multiple left reference lines may be applied to a coded block when intra bi-predication is applied to the coded block.

In various embodiments, there may be more than one reference line indexes for a block. A first reference line index may indicate a reference line to use among multiple top reference lines and a second reference line index may indicate more than one reference lines to use among multiple left reference lines; or vice versa, a first reference line index may indicate a reference line to use among multiple left reference lines and a second reference line index may indicate more than one reference line to use among multiple top reference lines. During encoding, the more than one reference line indexes for the block may be encoded into the coded bitstream; and/or during decoding, the more than one reference line indexes for the block may be decoded/extracted from the coded bitstream.

In some implementations, the step 1440 may include, the first reference line index indicates a non-adjacent reference line, and the first predictor is generated from a first sample at the non-adjacent reference line; and/or the second reference line index indicates a plurality of reference lines, and the second predictor is generated as a linear weighted average of samples, each of which is from each of the plurality of reference lines along a prediction angle.

In some other implementations, when intra bi-prediction is applied to generate the intra predictor from samples at the non-adjacent reference lines, one or both predictors are generated using the samples at multiple (more than 1) reference lines.

Figure 16:
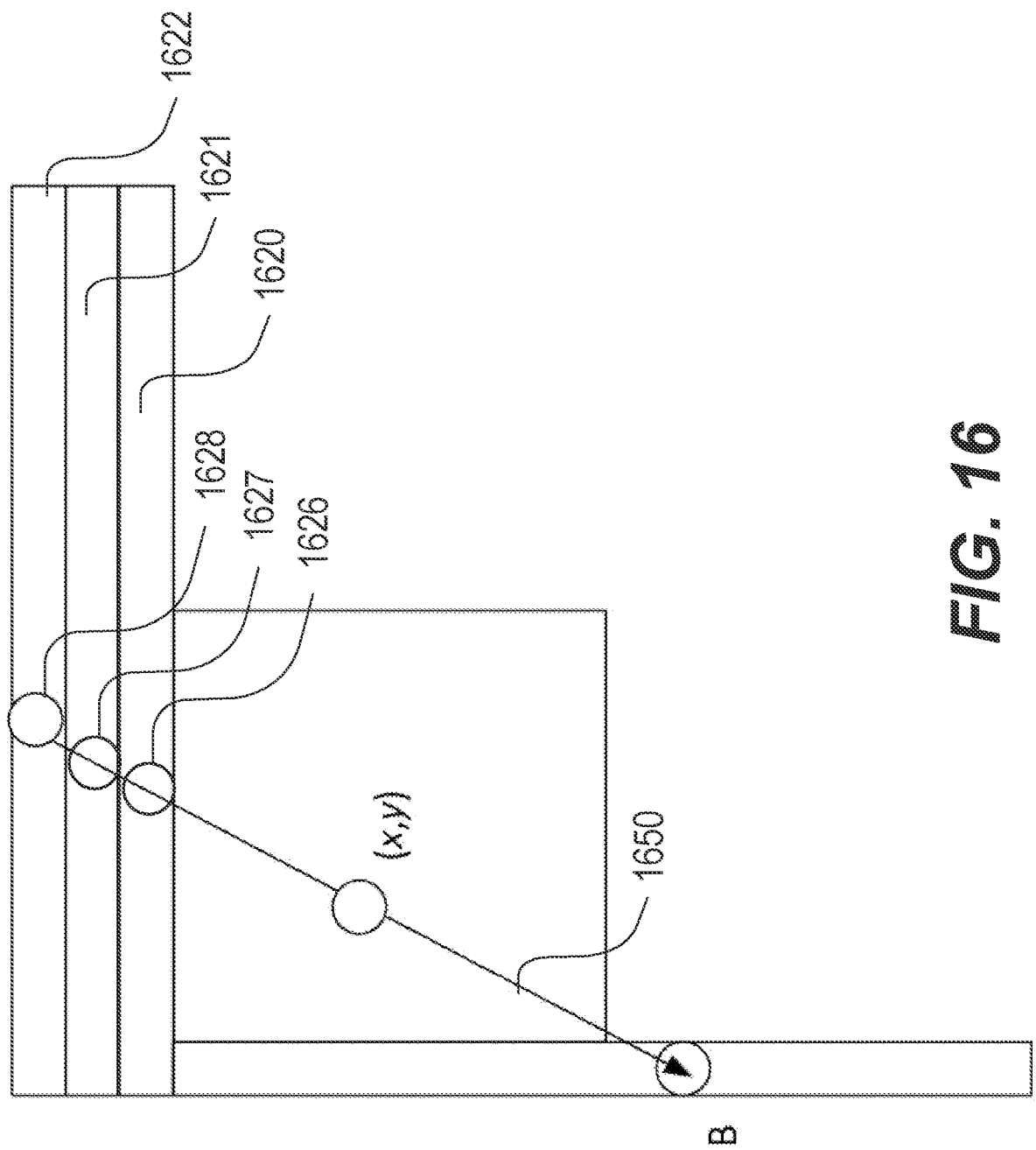
FIG. 16 shows another intra bi-prediction based on multiple reference lines according to example embodiments of the disclosure.

In one example referring to FIG. 16, a predictor is generated using a linear weighted sum of more than one samples from multiple reference lines along a prediction angle (1650): a first sample (1626) from a first reference line (1620), a second sample (1627) from a second reference line (1621), a third sample (1628) from a third reference line (1622). Weights for each sample may be predefined according to the relative positions of the samples (of multiple reference lines) involved in the derivation of the predictor.

In various embodiments, the method 1400 may further include: in response to determining that the intra bi-prediction applies to the block and the reference line index of the block indicating a non-adjacent reference line: disabling a reference sample filtering process, in response to a reference sample from the non-adjacent reference being available, using the reference sample for intra bi-prediction, and/or in response to the reference sample from the non-adjacent reference being unavailable, using a neighboring available reference sample for intra bi-prediction.

In some implementations, a reference sample filtering process may be disabled when bi-intra prediction is applied to one or more non-adjacent reference lines. Therefore, one or more reference samples from one or more non-adjacent (or non-zero) reference lines may be fetched and directly used for intra bi-prediction. If the one or more reference samples from the one or more non-adjacent (or non-zero) reference lines are not available, they may be padded from one or more neighboring available reference samples. In some other implementation, the padding to the non-available reference sample may include copying from the neighboring available reference samples.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block; and in the chroma block, the embodiments may be applied to more than one color components separately or may be applied to more than one color components together.

The techniques described above, can be implemented as computer software using computer-readable instructions and physically stored in one or more computer-readable media. For example, FIG. 17 shows a computer system (2600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 17:
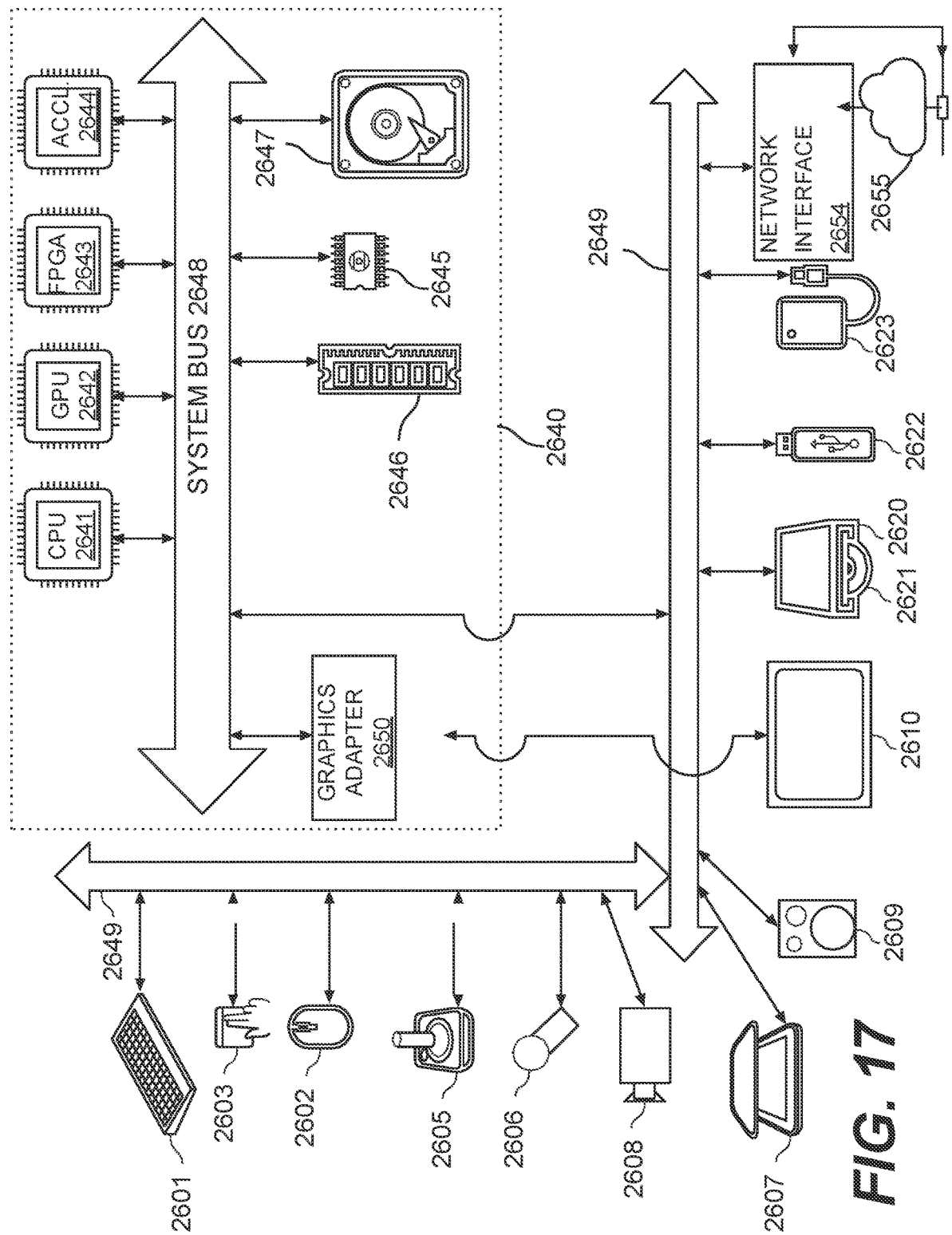
FIG. 17 shows a schematic illustration of a computer system in accordance with example embodiments of the disclosure.

The components shown in FIG. 17 for computer system (2600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2600).

Computer system (2600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2601), mouse (2602), trackpad (2603), touch screen (2610), data-glove (not shown), joystick (2605), microphone (2606), scanner (2607), camera (2608).

Computer system (2600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2610), data-glove (not shown), or joystick (2605), but there can also be tactile feedback devices that do not serve as input devices), audio output devices (such as: speakers (2609), headphones (not depicted)), visual output devices (such as screens (2610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2600) can also include human accessible storage devices and their associated media such as optical media including CD/DVD ROM/RW (2620) with CD/DVD or the like media (2621), thumb-drive (2622), removable hard drive or solid state drive (2623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2600) can also include an interface (2654) to one or more communication networks (2655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general-purpose data ports or peripheral buses (2649) (such as, for example USB ports of the computer system (2600)); others are commonly integrated into the core of the computer system (2600) by attachment to a system bus as described below (for example Ethernet interface into a PC computer system or cellular network interface into a smartphone computer system). Using any of these networks, computer system (2600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2640) of the computer system (2600).

The core (2640) can include one or more Central Processing Units (CPU) (2641), Graphics Processing Units (GPU) (2642), specialized programmable processing units in the form of Field Programmable Gate Areas (FPGA) (2643), hardware accelerators for certain tasks (2644), graphics adapters (2650), and so forth. These devices, along with Read-only memory (ROM) (2645), Random-access memory (2646), internal mass storage such as internal non-user accessible hard drives, SSDs, and the like (2647), may be connected through a system bus (2648). In some computer systems, the system bus (2648) can be accessible in the form of one or more physical plugs to enable extensions by additional CPUs, GPU, and the like. The peripheral devices can be attached either directly to the core's system bus (2648), or through a peripheral bus (2649). In an example, the screen (2610) can be connected to the graphics adapter (2650). Architectures for a peripheral bus include PCI, USB, and the like.

CPUs (2641), GPUs (2642), FPGAs (2643), and accelerators (2644) can execute certain instructions that, in combination, can make up the aforementioned computer code. That computer code can be stored in ROM (2645) or RAM (2646). Transitional data can also be stored in RAM (2646), whereas permanent data can be stored for example, in the internal mass storage (2647). Fast storage and retrieve to any of the memory devices can be enabled through the use of cache memory, that can be closely associated with one or more CPU (2641), GPU (2642), mass storage (2647), ROM (2645), RAM (2646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As a non-limiting example, the computer system having architecture (2600), and specifically the core (2640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2640) that are of non-transitory nature, such as core-internal mass storage (2647) or ROM (2645). The software implementing various embodiments of the present disclosure can be stored in such devices and executed by core (2640). A computer-readable medium can include one or more memory devices or chips, according to particular needs. The software can cause the core (2640) and specifically the processors therein (including CPU, GPU, FPGA, and the like) to execute particular processes or particular parts of particular processes described herein, including defining data structures stored in RAM (2646) and modifying such data structures according to the processes defined by the software. In addition or as an alternative, the computer system can provide functionality as a result of logic hardwired or otherwise embodied in a circuit (for example: accelerator (2644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While the particular invention has been described with reference to illustrative embodiments, this description is not meant to be limiting. Various modifications of the illustrative embodiments and additional embodiments of the invention will be apparent to one of ordinary skill in the art from this description. Those skilled in the art will readily recognize that these and various other modifications can be made to the exemplary embodiments, illustrated and described herein, without departing from the spirit and scope of the present invention. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

What is claimed is:

1. A method for intra bi-prediction and multiple reference line intra prediction in video decoding, the method comprising:
   receiving, by a device comprising a memory storing instructions and a processor in communication with the memory, a coded video bitstream for a block;
   determining, by the device, whether a single directional intra prediction or an intra bi-prediction applies to the block based on mode information of the block, the mode information of the block comprising at least one of a reference line index of the block, an intra prediction mode of the block, and a size of the block;
   in response to determining that the single directional intra prediction applies to the block, performing, by the device, the single directional intra prediction to the block;
   in response to determining that the intra bi-prediction applies to the block, performing, by the device, the intra bi-prediction to the block; and in response to determining that the intra bi-prediction applies to the block and the reference line index of the block indicating a non-adjacent reference line:
disabling a reference sample filtering process,
in response to a reference sample from the non-adjacent reference being available, using the reference sample for intra bi-prediction, and
in response to the reference sample from the non-adjacent reference being unavailable, using a neighboring available reference sample for intra bi-prediction.

2. The method according to claim 1, wherein the determining whether the single directional intra prediction or the intra bi-prediction applies to the block comprises:
in response to the reference line index of the block indicating a non-adjacent reference line, determining that the single directional intra prediction applies to the block.

3. The method according to claim 1, wherein the determining whether the single directional intra prediction or the intra bi-prediction applies to the block comprises:
in response to the reference line index of the block indicating an adjacent reference line, determining that the intra bi-prediction applies to the block.

4. The method according to claim 1, wherein the determining whether the single directional intra prediction or the intra bi-prediction applies to the block comprises:
in response to the reference line index of the block being greater than a predefined threshold, determining that the single directional intra prediction applies to the block; and
in response to the reference line index of the block not being greater than the predefined threshold, determining that the intra bi-prediction applies to the block.

5. The method according to claim 4, wherein the predefined threshold is a non-negative integer.

6. The method according to claim 1, wherein the determining whether the single directional intra prediction or the intra bi-prediction applies to the block comprises:
in response to the intra prediction mode of the block belonging to a first selected set of intra prediction modes and the reference line index indicating an adjacent reference line, determining that the intra bi-prediction applies to the block;
in response to the intra prediction mode of the block belonging to the first selected set of intra prediction modes and the reference line index indicating a non-adjacent reference line, determining that the single directional intra prediction applies to the block; and
in response to the intra prediction mode of the block belonging to a second selected set of intra prediction modes, determining that the intra bi-prediction applies to the block,
wherein the first selected set of intra prediction modes does not overlap with the second selected set of intra prediction modes.

7. The method according to claim 6, wherein the second selected set of intra prediction modes comprises a diagonal intra prediction mode.

8. The method according to claim 1, wherein the determining whether the single directional intra prediction or the intra bi-prediction applies to the block comprises:
in response to the reference line index of the block being an odd integer and/or the reference line index indicating a non-adjacent reference line, determining that the single directional intra prediction applies to the block; and
in response to the reference line index of the block being an even integer and/or the reference line index indicating an adjacent reference line, determining that the intra bi-prediction applies to the block.

9. The method according to claim 1, wherein the performing the intra bi-prediction to the block comprises:
determining a first predictor based on the reference line index of the block;
determining a second predictor based on the reference line index of the block; and
determining a final predictor for the block according to a weighted calculation between the first predictor and the second predictor.

10. The method according to claim 1, wherein the performing the intra bi-prediction to the block comprises:
determining a first predictor based on a first reference line index of the block;
determining a second predictor based on a second reference line index of the block; and
determining a final predictor for the block according to a weighted calculation between the first predictor and the second predictor.

11. The method according to claim 10, wherein:
the first reference line index indicates a non-adjacent reference line, and the first predictor is generated from a first sample at the non-adjacent reference line; and
the second reference line index indicates an adjacent reference line, and the second predictor is generated from a second sample at the adjacent reference line.

12. The method according to claim 10, wherein the performing the intra bi-prediction to the block comprises:
the first reference line index indicates a non-adjacent reference line, and the first predictor is generated from a first sample at the non-adjacent reference line; and
the second reference line index indicates a plurality of reference lines, and the second predictor is generated as a linear weighted average of samples, each of which is from each of the plurality of reference lines along a prediction angle.

13. An apparatus for intra bi-prediction and multiple reference line intra prediction in video decoding, the apparatus comprising:
a memory storing instructions; and
a processor in communication with the memory, wherein, when the processor executes the instructions, the processor is configured to cause the apparatus to:
receive a coded video bitstream for a block;
determine whether a single directional intra prediction or an intra bi-prediction applies to the block, based on mode information of the block, the mode information of the block comprising at least one of: a reference line index of the block, an intra prediction mode of the block, and a size of the block;
in response to determining that the single directional intra prediction applies to the block, perform the single directional intra prediction to the block;
in response to determining that the intra bi-prediction applies to the block, perform the intra bi-prediction to the block; and
in response to determining that the intra bi-prediction applies to the block and the reference line index of the block indicating a non-adjacent reference line:
disabling a reference sample filtering process,
in response to a reference sample from the non-adjacent reference being available, using the reference sample for intra bi-prediction, and in response to the reference sample from the non-adjacent reference being unavailable, using a neighboring available reference sample for intra bi-prediction.

14. The apparatus according to claim 13, wherein, when the processor is configured to cause the apparatus to determine whether the single directional intra prediction or the intra bi-prediction applies to the block, the processor is configured to cause the apparatus to:
in response to the reference line index of the block indicating a non-adjacent reference line, determine that the single directional intra prediction applies to the block.

15. The apparatus according to claim 13, wherein, when the processor is configured to cause the apparatus to determine whether the single directional intra prediction or the intra bi-prediction applies to the block, the processor is configured to cause the apparatus to:
in response to the reference line index of the block indicating an adjacent reference line, determine that the intra bi-prediction applies to the block.

16. The apparatus according to claim 13, wherein, when the processor is configured to cause the apparatus to determine whether the single directional intra prediction or the intra bi-prediction applies to the block, the processor is configured to cause the apparatus to:
in response to the reference line index of the block being greater than a predefined threshold, determine that the single directional intra prediction applies to the block; and
in response to the reference line index of the block not being greater than the predefined threshold, determine that the intra bi-prediction applies to the block.

17. A non-transitory computer readable storage medium storing instructions, wherein, when the instructions are executed by a processor, the instructions are configured to cause the processor to:
receive a coded video bitstream for a block;
determine whether a single directional intra prediction or an intra bi-prediction applies to the block, based on mode information of the block, the mode information of the block comprising at least one of: a reference line index of the block, an intra prediction mode of the block, and a size of the block;
in response to determining that the single directional intra prediction applies to the block, perform the single directional intra prediction to the block;
in response to determining that the intra bi-prediction applies to the block, perform the intra bi-prediction to the block; and
in response to determining that the intra bi-prediction applies to the block and the reference line index of the block indicating a non-adjacent reference line:
disabling a reference sample filtering process,
in response to a reference sample from the non-adjacent reference being available, using the reference sample for intra bi-prediction, and
in response to the reference sample from the non-adjacent reference being unavailable, using a neighboring available reference sample for intra bi-prediction.

18. The non-transitory computer readable storage medium according to claim 17, wherein, when the instructions are configured to cause the processor to determine whether the single directional intra prediction or the intra bi-prediction applies to the block, the instructions are configured to cause the processor to:
in response to the reference line index of the block indicating a non-adjacent reference line, determine that the single directional intra prediction applies to the block.

19. The non-transitory computer readable storage medium according to claim 17, wherein, when the instructions are configured to cause the processor to determine whether the single directional intra prediction or the intra bi-prediction applies to the block, the instructions are configured to cause the processor to:
in response to the reference line index of the block indicating an adjacent reference line, determine that the intra bi-prediction applies to the block.

* * * * *